US012036176B1

(12) United States Patent
Wang

(10) Patent No.: US 12,036,176 B1
(45) Date of Patent: Jul. 16, 2024

(54) MASSAGER

(71) Applicant: Dinghai Wang, Nanjing (CN)

(72) Inventor: Dinghai Wang, Nanjing (CN)

( * ) Notice: Subject to any disclaimer, the term of this patent is extended or adjusted under 35 U.S.C. 154(b) by 0 days.

(21) Appl. No.: 18/406,304

(22) Filed: Jan. 8, 2024

(30) Foreign Application Priority Data

Dec. 21, 2023 (CN) ........................ 202323510114.4

(51) Int. Cl.
*A61H 23/00* (2006.01)
*A61H 23/02* (2006.01)

(52) U.S. Cl.
CPC . *A61H 23/0263* (2013.01); *A61H 2201/1481* (2013.01); *A61H 2201/1676* (2013.01); *A61H 2201/5064* (2013.01)

(58) Field of Classification Search
None
See application file for complete search history.

(56) References Cited

U.S. PATENT DOCUMENTS 4,790,296 A * 12/1988 Segal .................... A61H 19/32 600/38
6,547,749 B2 * 4/2003 Hansen ................ F04B 45/043 601/149
7,572,240 B2 * 8/2009 Nan ...................... A61H 19/44 601/99
9,119,765 B2 * 9/2015 Topolev ................ A61H 19/44
10,940,076 B2 * 3/2021 Haddock ........... A61H 15/0085
2004/0147858 A1 * 7/2004 Lee ....................... A61H 19/44 601/101
2014/0288364 A1 * 9/2014 St. Bernard .......... A61H 19/34 601/48
2016/0367431 A1 * 12/2016 Ferrari .................. A61H 19/44
2022/0257458 A1 * 8/2022 Dickinson ............. A61H 19/44
2022/0257459 A1 * 8/2022 Dickinson .......... A61H 23/0263
2023/0024137 A1 * 1/2023 Larkin .................. A61H 19/44

* cited by examiner

*Primary Examiner* — LaToya M Louis
(74) *Attorney, Agent, or Firm* — Daniel M. Cohn; Howard M. Cohn

(57) ABSTRACT

A massager includes a housing, a driving component, a swinging component, and a flexible massage component. The housing defines a chamber and a swinging space along a length direction thereof. The driving component disposed in the chamber is connected to the swinging component. The flexible massage component is sleeved on a first portion of the swinging component disposed in the swinging space. The swinging component and the flexible massage component are driven by the driving component to swing back and forth along a transverse direction of the housing, and the flexible massage component swings from a first position outside side walls of the housing to a second position outside the side walls of the housing. When the flexible massage component swings to the first position or the second position, a free end of the flexible massage component is exposed to an external environment.

16 Claims, 18 Drawing Sheets

MASSAGER

TECHNICAL FIELD

The present disclosure relates to a field of household appliances, and in particular to a massager for daily use.

BACKGROUND

In the related art, massagers comprise electric massagers and non-electric massagers.

Compared with the non-electric massagers, the electric massagers generally comprise a power device (e.g., a battery), a driving device (e.g., a motor), and gears. The battery supplies power to the motor, the motor runs to drive the gears to rotate, and the gears rotate to drive a massage structure connected to one of the gears. The massage structure is mounted in a predetermined position to vibrate, so as to massage a human body.

SUMMARY

Embodiments of the present disclosure provide a massager. A driving component thereof is configured to drive a swinging component thereof to swing in a swinging space, so as to improve a massage experience.

The present disclosure provides the massager. The massager comprises a housing, a driving component, a swinging component, and a flexible massage component. The housing defines a chamber and a swinging space along a length direction thereof. The chamber is defined by an inner surface of the housing. The swinging space is defined by an outer surface of the housing.

A first portion of the swinging component is disposed in the chamber. A second portion of the swinging component is disposed in the swinging space. The driving component is disposed in the chamber. The driving component is connected to the swinging component and drives the swinging component to swing.

The flexible massage component is sleeved on the first portion of the swinging component disposed in the swinging space. The swinging component and the flexible massage component are driven by the driving component to swing back and forth along a transverse direction of the housing, and the flexible massage component swings from a first position outside side walls of the housing to a second position outside the side walls of the housing. When the flexible massage component swings to the first position or the second position, a free end of the flexible massage component protrudes from the side walls of the housing and is exposed to an external environment.

In one optional embodiment, a distance between the free end of the flexible massage component protruding from the side walls of the housing and the side walls of the housing is 2 cm.

In one optional embodiment, the massager further comprises a flexible outer cover; the flexible outer cover is sleeved on the housing. The flexible outer cover and the flexible massage component are integrally formed.

In one optional embodiment, the massager further comprises a sensor. The sensor is disposed in the chamber. The swinging component is configured to trigger the sensor in a swinging process of the swinging component, so that the sensor detects a position signal of the flexible massage component when the flexible massage component abuts against a human body.

In one optional embodiment, the massager further comprises a turbine and a gear; the driving component is connected to the turbine and drives the turbine to rotate; the turbine is engaged with the gear. The gear is connected to the swinging component and drives the swinging component to rotate.

The driving component drives the turbine to rotate, and the turbine rotates to drive the gear to rotate, so that the gear drives the swinging component to swing within a predetermined range.

In one optional embodiment, the driving component comprises a driving body and a driving shaft connected to the driving body. The turbine is fixedly connected to the driving shaft. A projection of the swinging component, a projection of the gear, and a projection of the turbine on a predetermined surface are located within a projection of the driving body on the predetermined surface. The predetermined surface is approximately perpendicular to the driving shaft.

In one optional embodiment, the massager further comprises a first shaft and a second shaft. The swinging component is rotatably connected to the first shaft; the gear is rotatably connected to the second shaft. A projection of the first shaft and a projection of the second shaft on the predetermined surface is within the projection of the driving body on the predetermined surface.

In one optional embodiment, the swinging component comprises a first swinging portion, a second swinging portion, and a third swinging portion. The gear is connected to the first swinging portion and drives the first swinging portion to rotate. The second swinging portion is fixedly connected to the first swinging portion. The second swinging portion is rotatably connected to the first shaft. The third swinging portion is fixedly connected to the second swinging portion.

The first swinging portion and the third swinging portion are bent with respect to the second swinging portion. The second swinging portion is located on one end of the turbine. The second swinging portion is spaced apart from the turbine. The first swinging portion and the gear are located on a peripheral side of the turbine.

In one optional embodiment, the third swinging portion comprises a swinging structure and at least one positioning structure. The at least one positioning structure is disposed on a peripheral side of the swinging structure. The flexible massage component is sleeved on the swinging structure and the at least one positioning structure.

In one optional embodiment, the first swinging portion, the second swinging portion, and the third swinging portion are integrally disposed.

In one optional embodiment, the first winging portion is disposed in the chamber. The third winging portion is disposed in the swinging space.

In one optional embodiment, the housing further comprises a through hole. The chamber is communicated with the swinging space through the through hole. The second swinging portion is at least partially disposed in the through hole.

In one optional embodiment, an end surface of the gear away from the turbine is connected to the first swinging portion through an eccentric wheel.

In one optional embodiment, the eccentric wheel and the gear are integrally disposed.

In one optional embodiment, the first swinging portion defines a swinging groove. A shaft of the eccentric wheel is movable in the swinging groove.

In one optional embodiment, the first swinging portion comprises reinforcing piece. The reinforcing piece is disposed around the swinging groove.

In one optional embodiment, the massager further comprises a sensor. The sensor is disposed in the chamber. The swinging component is configured to trigger the sensor in a swinging process of the swinging component, so that the sensor detects a position signal of the flexible massage component when the flexible massage component abuts against a human body.

In one optional embodiment, the housing comprises a first side wall and a second side wall. The first side wall and the second side wall of the housing are spaced apart from each other and disposed opposite to each other. The first side wall and the second side wall of the housing define the swinging space.

The housing further comprises a reinforcing structure disposed on the first side wall and a reinforcing structure disposed on the second side wall of the housing. The reinforcing structure on the first side wall and the reinforcing structure on the second side wall are spaced apart from each other and are disposed opposite to each other. At least one of the reinforcing structure on the first side wall and the reinforcing structure on the second side wall comprises reinforcing ribs. The reinforcing ribs are spaced apart from each other. The reinforcing ribs extend along the length direction of the housing.

In one optional embodiment, each of the reinforcing ribs comprises a first reinforcing section, a second reinforcing section, a third reinforcing section, and a fourth reinforcing section. Each first reinforcing section, a corresponding second reinforcing section, a corresponding third reinforcing section, and a corresponding fourth reinforcing section are sequentially connected in a direction from a position close to the chamber to a top end of the housing.

A height of each first reinforcing section on the second side wall is greater than a height of each second reinforcing section on the second side wall and a height of each third reinforcing section on the second side wall; and/or a height of a lowest point of each second reinforcing section on the second side wall is not less than a height of a topmost point of each third reinforcing section on the second side wall; and/or a height of a topmost point of each fourth reinforcing section on the second side wall is greater than a height of the topmost point of each third reinforcing section on the second side wall, and a height of a lowest point of each fourth reinforcing section on the second side wall is less than a lowest point of each third reinforcing section on the second side wall.

In one optional embodiment, each first reinforcing section is of a rectangular structure; each third reinforcing section is of a rectangular structure; and/or the height of each second reinforcing section on the second side wall gradually decreases along the direction from the position close to the chamber to the top end of the housing; and/or the height of each fourth reinforcing section on the second side wall gradually increases along the direction from the position close to the chamber to the top end of the housing.

In the embodiments of the present disclosure, the driving component drives the swinging component and the flexible massage component to swing in the swinging space. During the swinging process, the swinging component and the flexible massage component swing from the first position to the second position and swing from the second position to the first position. When the flexible massage component is in the first position or the second position, at least part of the flexible massage component, such as the free end of the flexible massage component protrudes from the side walls of the housing to be exposed to an external environment, so that a massage mode of a swing flapping effect is realized, and the user experience is improved.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

For a complete understanding of the present disclosure and its characteristics, the following description will be made in conjunction with the accompanying drawings, where same reference numbers in the following description indicate same structures.

In the drawings.

Figure 1:
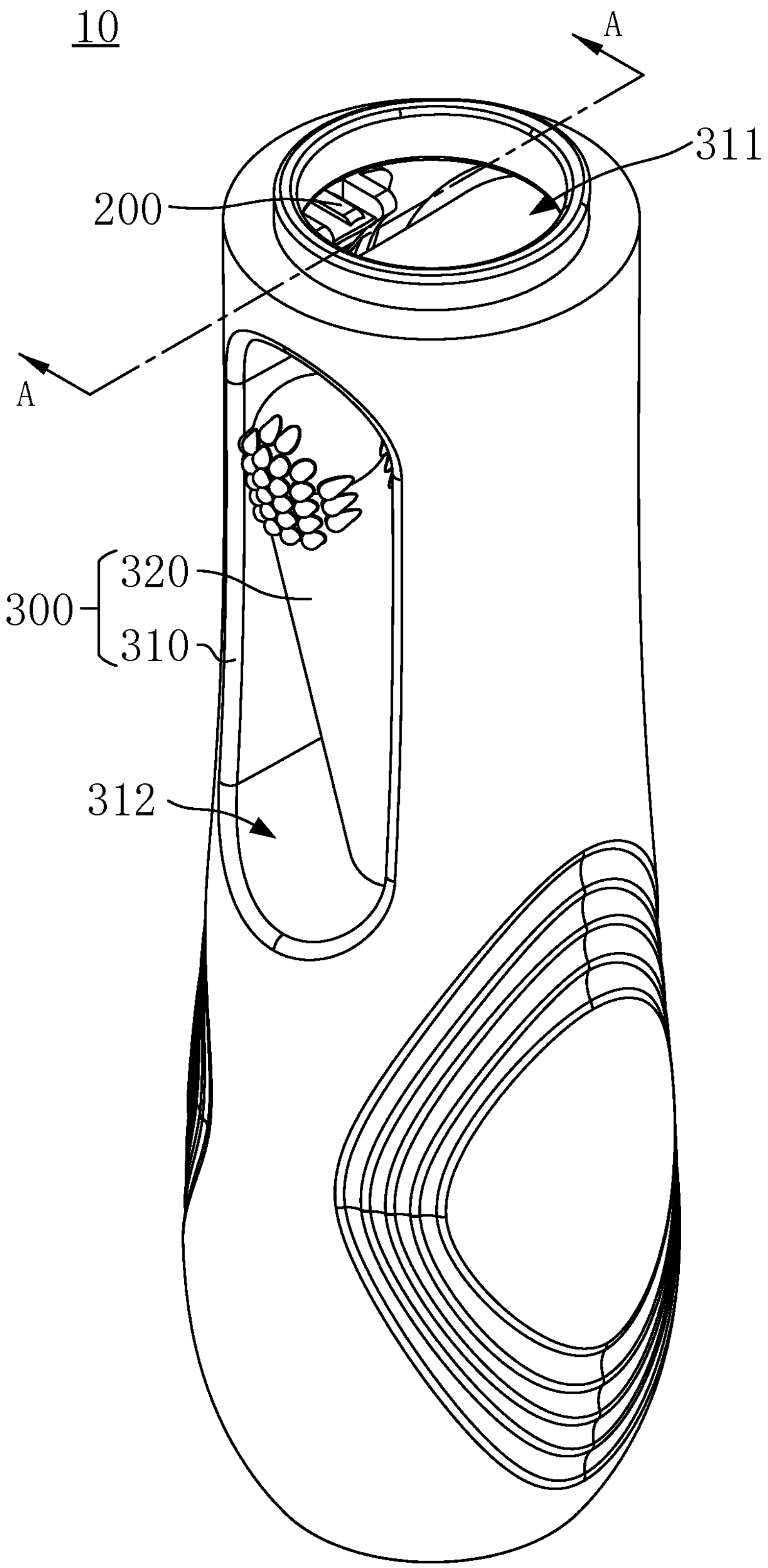
FIG. 1 is a perspective schematic diagram of a massager main body of a massager according to one embodiment of the present disclosure.

Length direction—L1; transverse direction—L2; predetermined range—Z; first position—X; second position—Y; massager main body—10; second massage device—20; battery—21; bottom massage driving device—22; circuit board—23; air control device—24; bottom housing—25; bottom outer cover—26; bottom massage component—27; operation button—28; charging terminal—29; connecting assembly—30; massage head—40; massage head cover—41; top motor—42; top housing—43; top eccentric wheel—44; massage driving device—100; driving component—110; driving body—111; driving shaft—112; driving surface—113; first mounting holes—114; connecting contacts—115; swinging component—120; first swinging portion t—121; second swinging portion—122; third swinging portion—123; touching portion—124; gear—130; turbine—140; rotating body—141; rotating teeth—142; first shaft hole—143; first shaft—150; second shaft—160; eccentric wheel—170; shaft—171; driving housing—180; first driving sub-shell—181; second driving sub-shell—182; restricting hole—183; housing—200; chamber—201; swinging space—202; first through—hole—203; inner surface—204; outer surface—205; first side wall—206; second side wall—207; first sub-shell—210; second sub-shell—220; reinforcing structure on the second side wall—230; first reinforcing section—231; second reinforcing section—232; third reinforcing section—233; fourth reinforcing section—234; first recess—235; third recess—236; reinforcing structure on the first side wall—240; second recess—246; fourth screw hole—250; sleeving portion—260; second through—hole—270; clamping structure—280; flexible massage sleeve —300; flexible outer cover —310; opening —311; swing space—312; flexible massage component—320; sensor—400; swinging groove—1211; reinforcing piece—1212; fourth shaft hole—1221; swinging structure—1231; positioning structure—1232; second shaft hole—1811; mounting groove—1812; second mounting hole—1813; first screw holes—1814; limiting hole—1815; third shaft hole—1821; second screw holes—1822; bottom massage motor—2201; bottom eccentric wheel—2202; shaft sleeve—2203; bottom swinging component—2204; bottom massage driving housing—2205; reinforcing rib—2300; air pump—2401; solenoid valve—2402; first bottom shell—2501; second bottom shell—2502; connecting shell—2503; clamping groove—2601; button hole—2602; mouth-shaped massage component—2701; massage cavity—2702; massage tongue 2703; connecting portion—2704; passage—3101; dissipating hole—3102; fifth through hole—3103; first top shell—4301; second top shell—4302; third screw hole—4303; swinging slot—22041; swinging column—22042; sixth shaft hole—22043; vent hole—25031; fourth through hole—25032; reinforcing ring—25033; third through hole—25034.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. The following description of at least one exemplary embodiment is merely illustrative and is in no way intended as any limitation on the present disclosure, applications thereof, and use thereof. Based on the embodiments of the present disclosure, all other embodiments obtained by those of ordinary skill in the art without creative work shall fall within the protection scope of the present disclosure.

Reference herein to “embodiment” or “implement” means that a particular feature, structure, or characteristic described in connection with one embodiment or one implement may be included in at least one embodiment of the present disclosure. The appearances of the “embodiment” in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

Embodiments of the present disclosure provide a massager. The massager comprises a massager main body 10. The massager main body 10 comprises a housing 200, a massage driving device 100, and a flexible massage component 320.

The housing 200 defines a length direction L1. The housing 200 comprises a chamber 201 and a swinging space 202 defined along the length direction L1, and the chamber 201 is communicated with the swinging space 202. For instance, the housing 200 comprises the chamber 201, a first through hole 203, and a swinging space 202 along the length direction L1, and the chamber 201 is communicated with the swinging space 202 through the first through hole 203. The chamber 201 is defined by an inner surface 204 of the housing 200, the swinging space 202 is defined by an outer surface 205 of the housing 200, and the first through hole 203 penetrates the chamber 201, so that the chamber 201 is communicated with the swinging space 202.

For instance, the housing 200 is formed by connecting sub-shells. It is understood that at least two sub-shells are provided. Specifically, the housing 200 comprises two sub-shells, such as a first sub-shell 210 and a second sub-shell 220. The first sub-shell 210 and the second sub-shell 220 are connected to each other (e.g., the first sub-shell 210 and the second sub-shell 220 are connected by screws). Both of the first sub-shell 210 and the second sub-shell 220 define a length direction, the length direction of the first sub-shell 210 and the length direction of the second sub-shell 220 are same as the length direction L1 of the housing 200, and details are not described herein. The chamber 201, the first through hole 203, and the swinging space 202 are jointly defined by the first sub-shell 210 and the second sub-shell 220.

For instance, one side of the swinging space 202 away from the chamber 201 is not closed.

The massage driving device 100 comprises a swinging component 120, a gear 130, and a driving component 110. As shown in FIGS. 6-10, the driving component 110 is fixedly connected to a turbine 140, the turbine 140 is engaged with the gear 130, and the gear 130 is connected to the swinging component 120 and drives the swinging component 120 to swing. The driving component 110 drives the turbine 140 to rotate, and the turbine drives the gear 130 to rotate, so that the gear 130 drives the swinging component 120 to swing within a predetermined range Z.

The driving component 110 is a driving moto (i.e., an electric motor).

The driving component 110 comprises a driving body 111 and a driving shaft 112 connected to the driving body 111. The driving shaft 112 is rotatable on the driving body 111. The driving body 111 defines a driving surface 113, and the driving shaft 112 is mounted on the driving surface 113 of the driving body 111. The driving component 110 further comprises two connecting contacts 115, and the two connecting contacts 115 are disposed on a surface, opposite to the driving surface 113, of the driving body 111. For instance, the two connecting contacts 115 are configured to connect to wires, the wires may be connected to a circuit board, or the wires may be connected to a power source such as a battery.

The turbine 140 is fixedly connected to the driving shaft 112. Specifically, the turbine 140 comprises a rotating body 141 and rotating teeth 142, and the rotating teeth 142 are disposed on a peripheral side of the rotating body 141. The turbine 140 further comprises a first shaft hole 143 disposed on the rotating body 141, the first shaft hole 143 penetrates the rotating body 141, and the rotating teeth 142 are disposed around a peripheral side of the first shaft hole 143. The first shaft hole 143 is configured to accommodate the driving shaft 112. The driving shaft 112 is mounted in the first shaft hole 143, and the driving shaft 112 is fixedly connected to the rotating body 141. Thus, during rotation of the driving shaft 112, the driving shaft 112 drives the turbine 140 fixedly connected to the driving shaft 112 to rotate.

The gear 130 and the swinging component 120 are mounted on a driving housing 180 of the massage driving device 100 through shafts.

For instance, the massage driving device 100 comprises a first shaft 150 and a second shaft 160. Both of the first shaft 150 and the second shaft 160 are mounted on the driving housing 180.

For instance, the driving housing 180 comprises driving sub-shells, such as a first driving sub-shell 181 and a second driving sub-shell 182. The first driving sub-shell 181 is connected to the second driving sub-shell 182. For instance, the first driving sub-shell 181 and the second driving sub-shell 182 are connected through connecting component. The connecting component comprises one or more screws. Specifically, the present disclosure take an example that the connecting component comprises the screws for illustration. For instance, the first driving sub-shell 181 defines first screw holes 1814, and the second driving sub-shell 182 defines second screw holes 1822. Each of the screws are mounted in a corresponding first screw hole 1814 and a corresponding second screw hole 1822. It is understood that the screws are one-to-one mounted in the first screw holes 1814 and the second screw holes 1822.

It should be noted that the first driving sub-shell 181 and the second driving sub-shell 182 may be connected in other manners. For instance, the first driving sub-shell 181 and the second driving sub-shell 182 are connected through an adhesive layer or welding, which is not limited thereto.

For instance, the first driving sub-shell 181 is connected to the driving component 110. Specifically, the first driving sub-shell 181 is connected to the driving body 111 of the driving component 110. The first driving sub-shell 181 is connected to the driving surface 113 of the driving body 111. First mounting holes 114 are defined on the driving surface 113 of the driving body 111 of the driving component 110. Second mounting holes 1813 are defined on the first driving sub-shell 181. Mounting structures are respectively mounted in the second mounting holes 1813 and the first mounting holes 114 to connect the first driving sub-shell 181 to the driving surface 113 of the driving body 111. That is, each of the mounting structures is mounted in a corresponding second mounting hole 1813 and a corresponding first mounting hole 114. Optionally, the mounting structures are screws.

It should be noted that the first driving sub-shell 181 further defines a limiting hole 1815, and the limiting hole 1815 is configured to limit the driving shaft 112 and the turbine 140.

For instance, the second mounting holes 1813 and the limiting hole 1815 are located on a same surface of the first driving sub-shell 181. The second mounting holes 1813 are defined around the limiting hole 1815.

For instance, the first shaft 150 is mounted in the first driving sub-shell 181 and the second driving sub-shell 182. The first driving sub-shell 181 defines a second shaft hole 1811, the second driving sub-shell 182 defines a third shaft hole 1821, and two ends of the first shaft 150 are respectively mounted in the second shaft hole 1811 and the third shaft hole 1821. The swinging component 120 is mounted in the driving housing 180 through the first shaft 150. Specifically, the swinging component 120 is rotatably connected to the first shaft 150. The swinging component 120 is capable of swinging within the predetermined range around the first shaft 150.

For instance, the swinging component 120 comprises a first swinging portion 121, a second swinging portion 122, and a third swinging portion 123. The gear 130 is connected to the first swinging portion 121 and drives the first swinging portion 121 to rotate. The first swinging portion 121 defines a swinging groove 1211. In order to increase stability of the first swinging portion 121, in the embodiment of the present disclosure, a reinforcing piece 1212 is disposed on the first swinging portion 121. The reinforcing piece 1212 is disposed around the swinging groove 1211, and the reinforcing piece 1212 surrounds a peripheral side of the swinging groove 1211.

The second swinging portion 122 is fixedly connected to the first swinging portion 121. The second swinging portion 122 is rotatably connected to the first shaft 150. For instance, the second swinging portion 122 defines a fourth shaft hole 1221, and the first shaft 150 passes through the fourth shaft hole 1221.

The third swinging portion 123 is fixedly connected to the second swinging portion 122.

The third swinging portion 123 is fixedly connected to the second swinging portion 122. For instance, the first swinging portion 121, the second swinging portion 122, and the third swinging portion 123 are integrally disposed. The first swinging portion 121 and the third swinging portion 123 are respectively connected to two ends of the second swinging portion 122.

For instance, the first swinging portion 121 and the third swinging portion 123 are bent with respect to the second swinging portion 122. The second swinging portion 122 is located on one end of the turbine 140. The second swinging portion 122 is spaced apart from the turbine 140.

It should be noted that a distance between the second swinging portion 122 and the turbine 140 is less than a predetermined distance (e.g., the distance between the second swinging portion 122 and the turbine 140 is less than about 1 cm, such as 0.5-1.3 cm). The first swinging portion 121 and the gear 130 are located on a peripheral side of the turbine 140. It is understood that teeth of the gear 130 are engaged with the rotating teeth 142 of the turbine 140.

For instance, the second shaft 160 is mounted on the first driving sub-shell 181 or the second driving sub-shell 182. In the embodiment of the present disclosure, the second shaft 160 is mounted on the first driving sub-shell 181, the first driving sub-shell 181 defines a mounting groove 1812, and a first portion of the second shaft 160 is mounted in the mounting groove 1812.

The gear 130 is rotatably connected to the second shaft 160. For instance, a second portion of the second shaft 160 passes through a fifth shaft hole of the gear 130. It should be noted that the second shaft 160 is filled in the fifth shaft hole of the gear 130, so the fifth shaft hole of the gear 130 is not shown in the drawings.

It is understood that the first portion of the second shaft 160 protrudes from a first end surface of the gear 130, and a second end surface of the gear 130 away from the turbine 140 is connected to the first swinging portion 121 through an eccentric wheel 170. A shaft 171 of the eccentric wheel 170 is at least partially located in the swinging groove 1211, and the shaft 171 of the eccentric wheel 170 is movable in the swinging groove 1211. For instance, the eccentric wheel 170 and the gear 130 are integrally disposed.

In the embodiments of the present disclosure, in order to increase overall compactness of the massage driving device 100 and save a space where the massage driving device 100 is disposed in the housing 200, a projection of the swinging component 120, a projection of the gear 130, and a projection of the turbine 140 on a predetermined surface are located within a projection of the driving body 111 on the predetermined surface. The predetermined surface is approximately perpendicular to the driving shaft 112. It should be noted that the predetermined surface in the embodiment of the present disclosure is equivalent to the driving surface 113, so that the swinging component 120, the gear 130, and the turbine 140 in the embodiment of the present disclosure are located on one side of the driving surface 113 of the driving component 110 and do not extend beyond a peripheral side of the driving component 110. Therefore, in the embodiment of the present disclosure, during a process of mounting the massage driving device 100, a space of the chamber 201 of the housing 200 adapts to a size of the peripheral side of the driving component 110. In the related art, gears are disposed on a driving device on an outer side of a motor, and compared with the related art, the present disclosure greatly save the space occupied by the massage driving device 100 in the housing 200. Therefore, in the embodiment of the present disclosure, the massage driving device 100 also saves a space of the massager main body 10 and reduce a volume of the massager main body 10 under a condition that a driving force is effectively provided, thereby realizing a miniaturization of the massager main body 10.

The projection of the swinging component 120, the projection of the gear 130, and the projection of the turbine 140 on the predetermined surface are located within the projection of the driving body 111 on the predetermined surface, so that other components of the massage driving device 100 of the embodiment of the present disclosure except for the driving component 110 are located on the one side of the driving surface 113 of the driving component 110 without extending beyond the peripheral side of the driving component 110. The overall compactness of the massage driving device 100 is greatly improved, and the space of the massage driving device 100 in the housing 200 is greatly saved.

The driving housing 180 comprises a restricting hole 183. For instance, the restricting hole 183 allows a portion of the swinging component 120 to pass through, and at least part of the swinging component 120 passes through the driving housing 180 from the restricting hole 183 and is located outside the driving housing 180. For instance, the third swinging portion 123 of the swinging component 120 is located outside the driving housing 180, and a portion of the second swinging portion 122 is located in the restricting hole 183.

In the embodiment of the present disclosure, the swinging component 120 swings back and forth along a transverse direction L2 of the housing 200 under driving of the driving component 110. It is understood that the transverse direction L2 of the housing 200 is perpendicular to the length direction of the housing 200.

In the embodiment of the present disclosure, the driving component 110 is energized to enable the driving shaft 112 to rotate while driving the turbine 140 to rotate. The turbine 140 rotates, so the gear 130 engaged with the turbine 140 is driven to rotate, and the gear 130 rotates to drives the eccentric wheel 170 fixed thereto to rotate together. The shaft 171 of the eccentric wheel 170 is disposed in the swinging groove 1211, and the shaft 171 of the eccentric wheel 170 drives the first swinging portion 121 to swing around the first shaft 150 during rotation of the shaft 171 of the eccentric wheel 170 along with the gear 130. When the first swinging portion 121 swings around the first shaft 150, since the third swinging portion 123 and the first swinging portion 121 are bent with respect to the second swinging portion 122, the third swinging portion 123 swings synchronously with the first swinging portion 121.

The flexible massage component 320 is sleeved on the swinging component 120, and the flexible massage component 320 is sleeved on a portion of the swinging portion 120 located in the swinging space 202. In particular, the flexible massage component 320 is sleeved on the third swinging portion 123 of the swinging component 120. In order to increase stability of the flexible massage component 320 sleeved on the third swinging portion 123, the third swinging portion 123 in the embodiment of the present disclosure comprises a swinging structure 1231 and positioning structures 1232. The positioning structures 1232 are disposed on a peripheral side of the swinging structure 1231. In the embodiment, two positioning structures 1232 are provided and the two positioning structures 1232 are spaced on the peripheral side of the swinging structure 1231. For instance, the two positioning structures 1232 are disposed at equal intervals on the peripheral side of the swinging structure 1231. Specifically, a length of each of the positioning structures 1232 is less than a length of the swinging structure 1231. The flexible massage component 320 is sleeved on the swinging structure 1231 and the two positioning structures 1232.

In the embodiment of the present disclosure, the flexible massage component 320 is sleeved on the third swinging portion 123, the swinging component 120 and the flexible massage component 320 swing back and forth along the transverse direction L2 of the housing 200 under the driving of the driving component 110, and the flexible massage component 320 swings from the first position X outside the side walls of the housing 200 to the second position Y outside the side walls of the housing 200. In the first position X and the second position Y, the free end of the flexible massage component 320 exceeds the side walls of the housing 200 and is exposed to the external environment. The free end of the flexible massage component 320 exceeds the side walls of the housing 200 at a distance of about 2 cm, such as 1.5-2.5 cm.

It is understood that when the driving component 110 is energized, the driving shaft 112 rotates, synchronously driving the turbine 140 to rotate. The turbine 140 is engaged with the gear 130, the turbine 140 drives the gear 130 to rotate, the gear 130 synchronously drives the eccentric wheel 170 to rotate, and the shaft 171 of the eccentric wheel 170 drives the first swinging portion 121 of the swinging component 120 to swing around the first shaft 150, synchronously driving the third swinging portion 123 and the flexible massage component 320 sleeved on the third swinging portion 123 to swing within the predetermined range Z.

It is also understood that the predetermined range Z is understood as an included angle, or an arc, formed between the first position X and the second position Y with respect to the first shaft 150. It is noted that since the flexible massage component 320 is sleeved on the third swinging portion 123, when the third swinging portion swings, a predetermined range Z of the third swinging portion 123 is same as the predetermined range Z of the flexible massage component 320.

Figure 2:
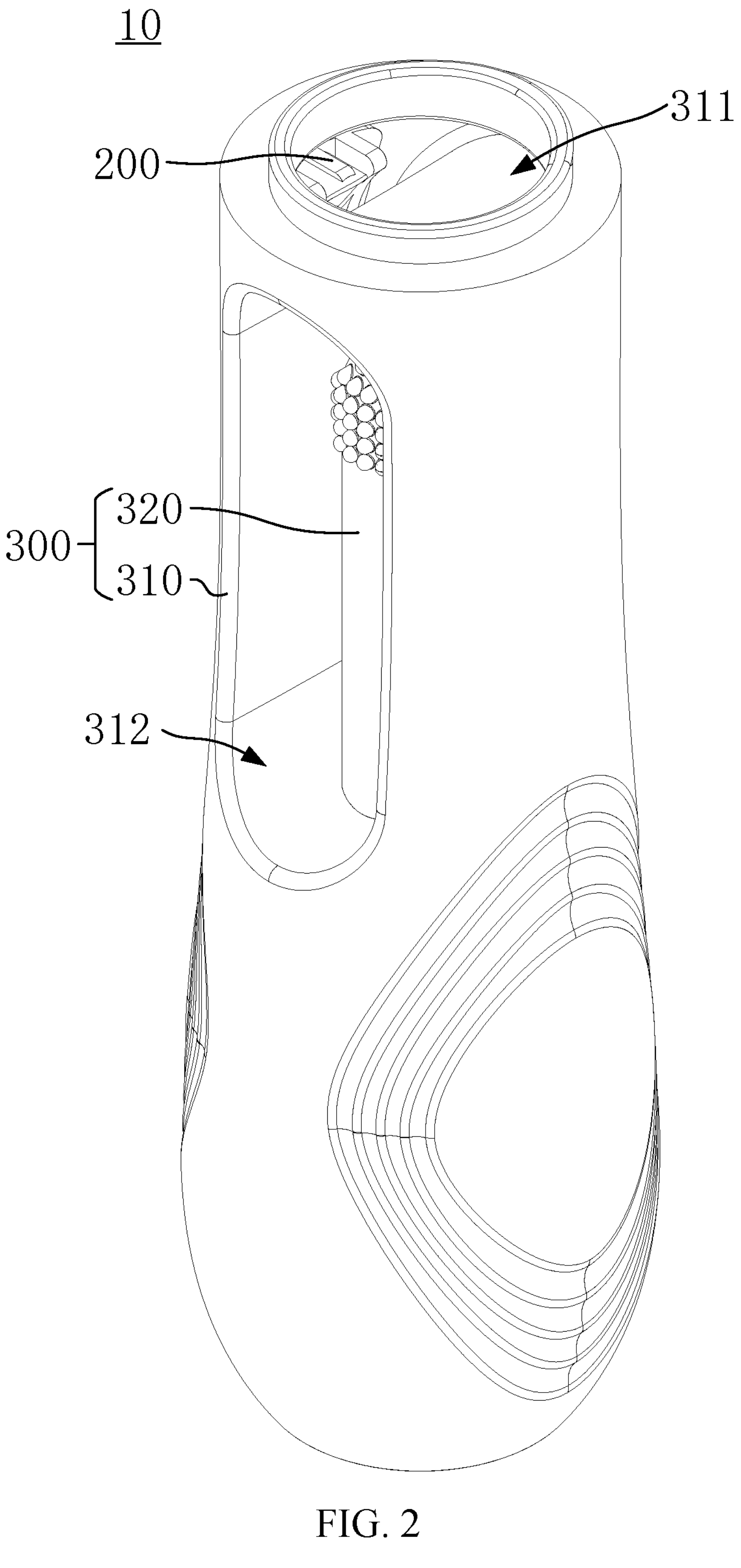
FIG. 2 is another perspective schematic diagram of the massager main body of the massager according to one embodiment of the present disclosure.
Figure 3:
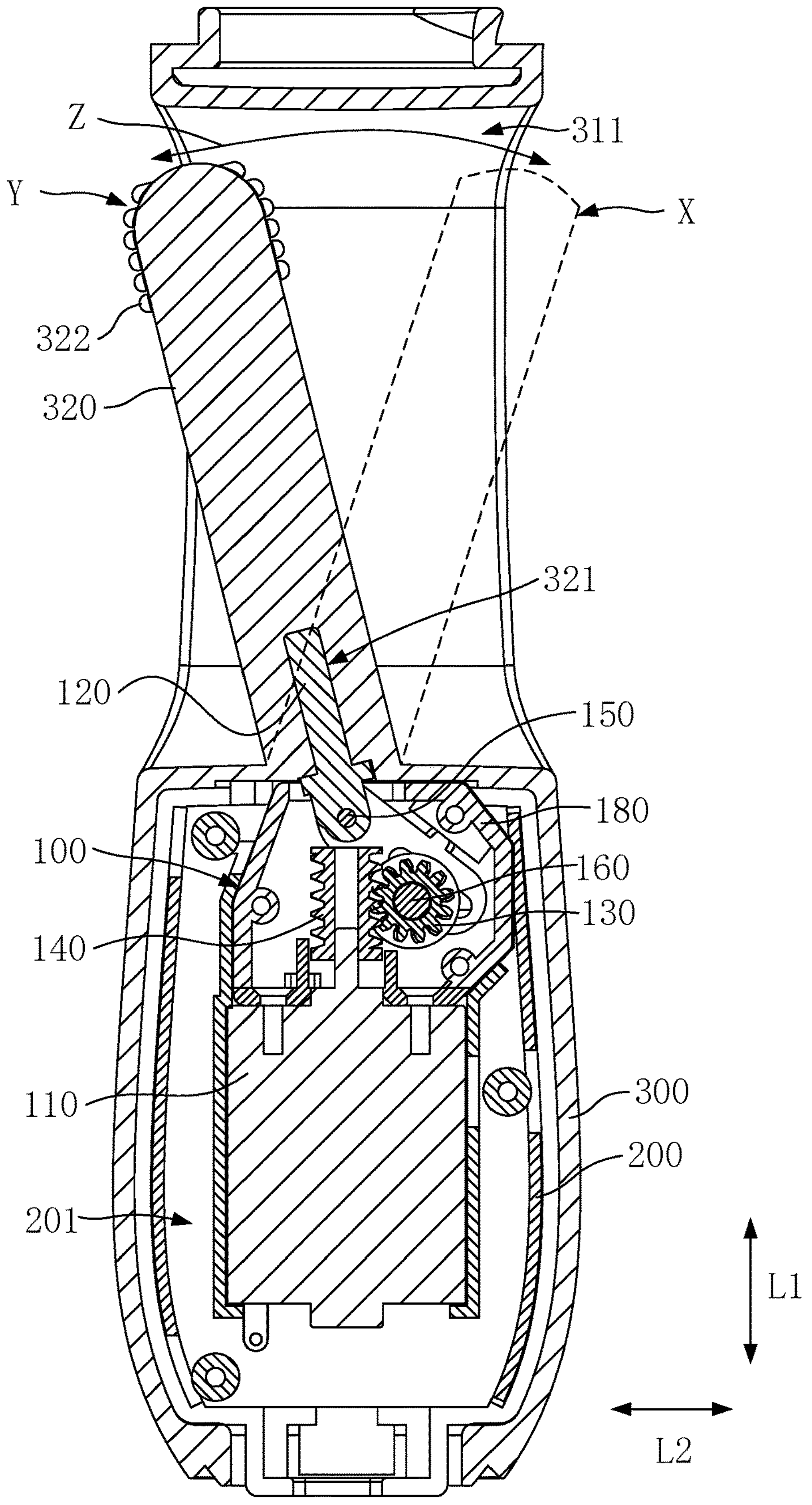
FIG. 3 is a cross-sectional schematic diagram of the massager main body of the massager taken along the line A-A shown in FIG. 1.
Figure 4:
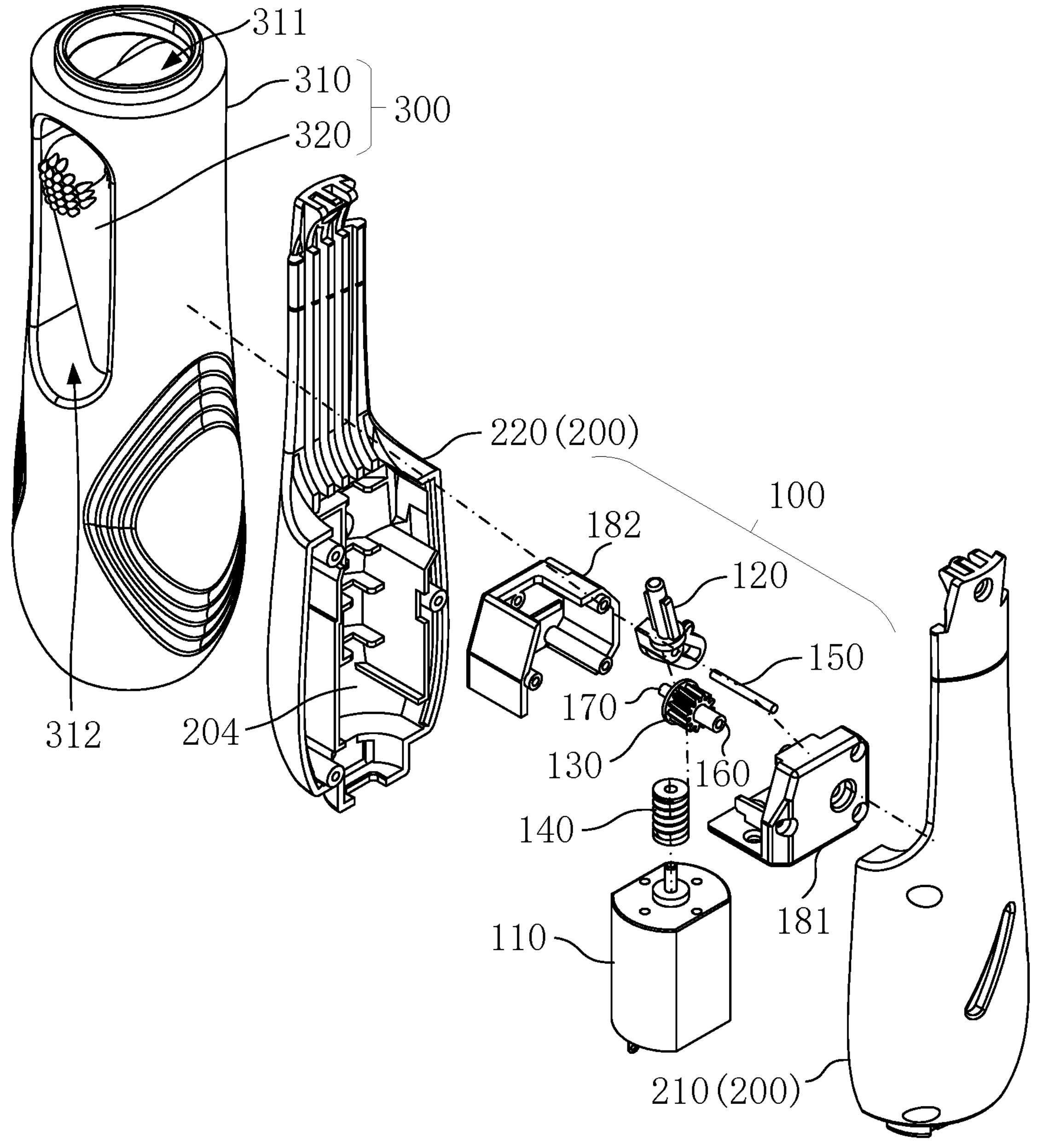
FIG. 4 is an exploded schematic diagram of the massager main body of the massager according to one embodiment of the present disclosure.
Figure 5:
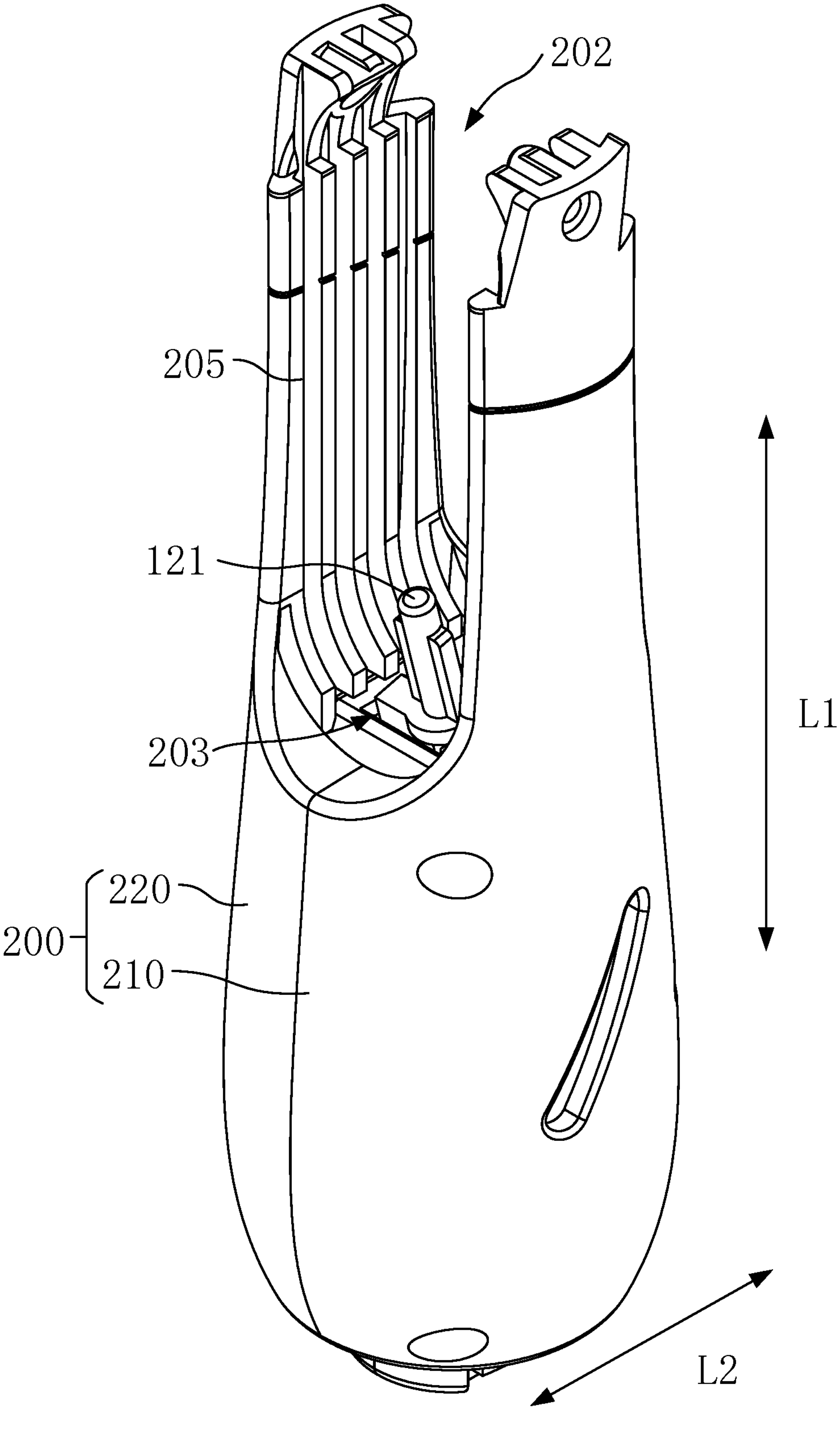
FIG. 5 is a schematic diagram of a massage driving device assembled with a housing of the massager according to one embodiment of the present disclosure.
Figure 6:
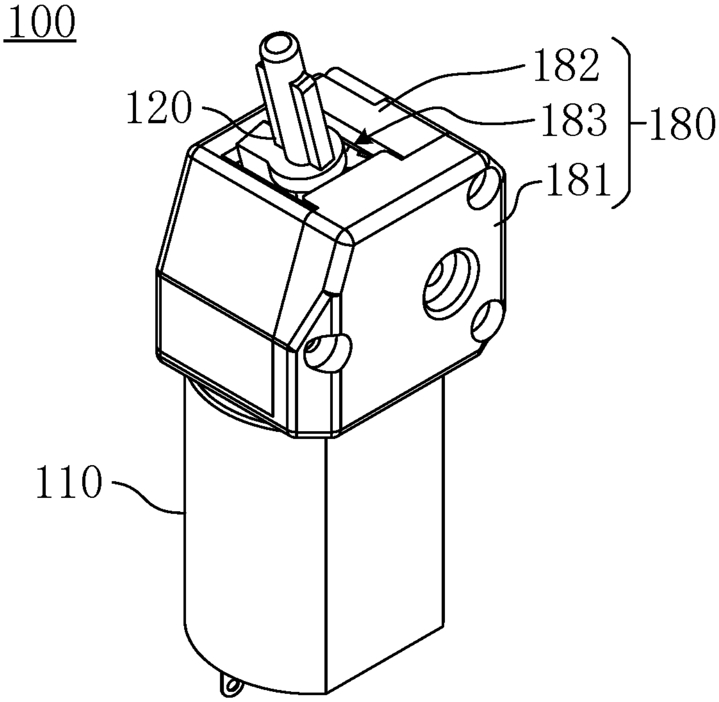
FIG. 6 is a perspective schematic diagram of the massage driving device of the massager according to one embodiment of the present disclosure.
Figure 7:
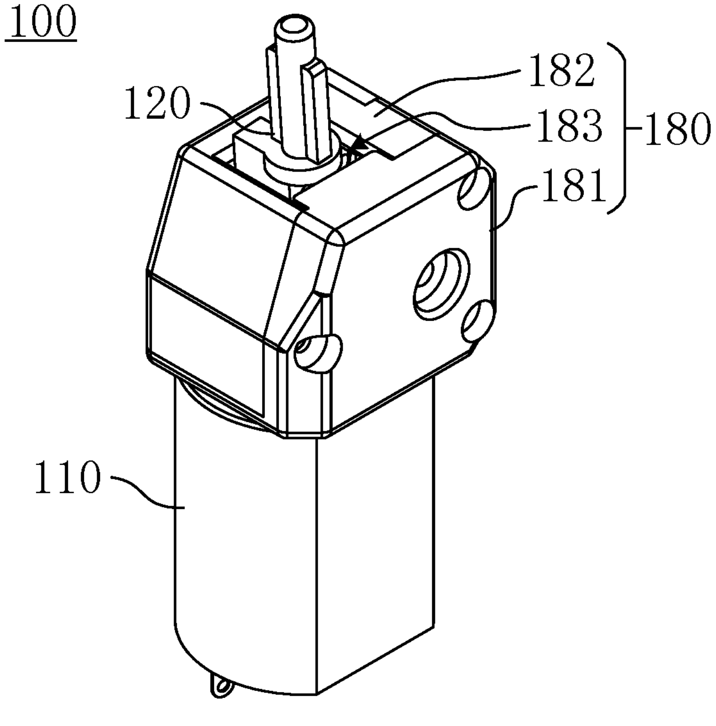
FIG. 7 is another perspective schematic diagram of the massage driving device of the massager according to one embodiment of the present disclosure.
Figure 8:
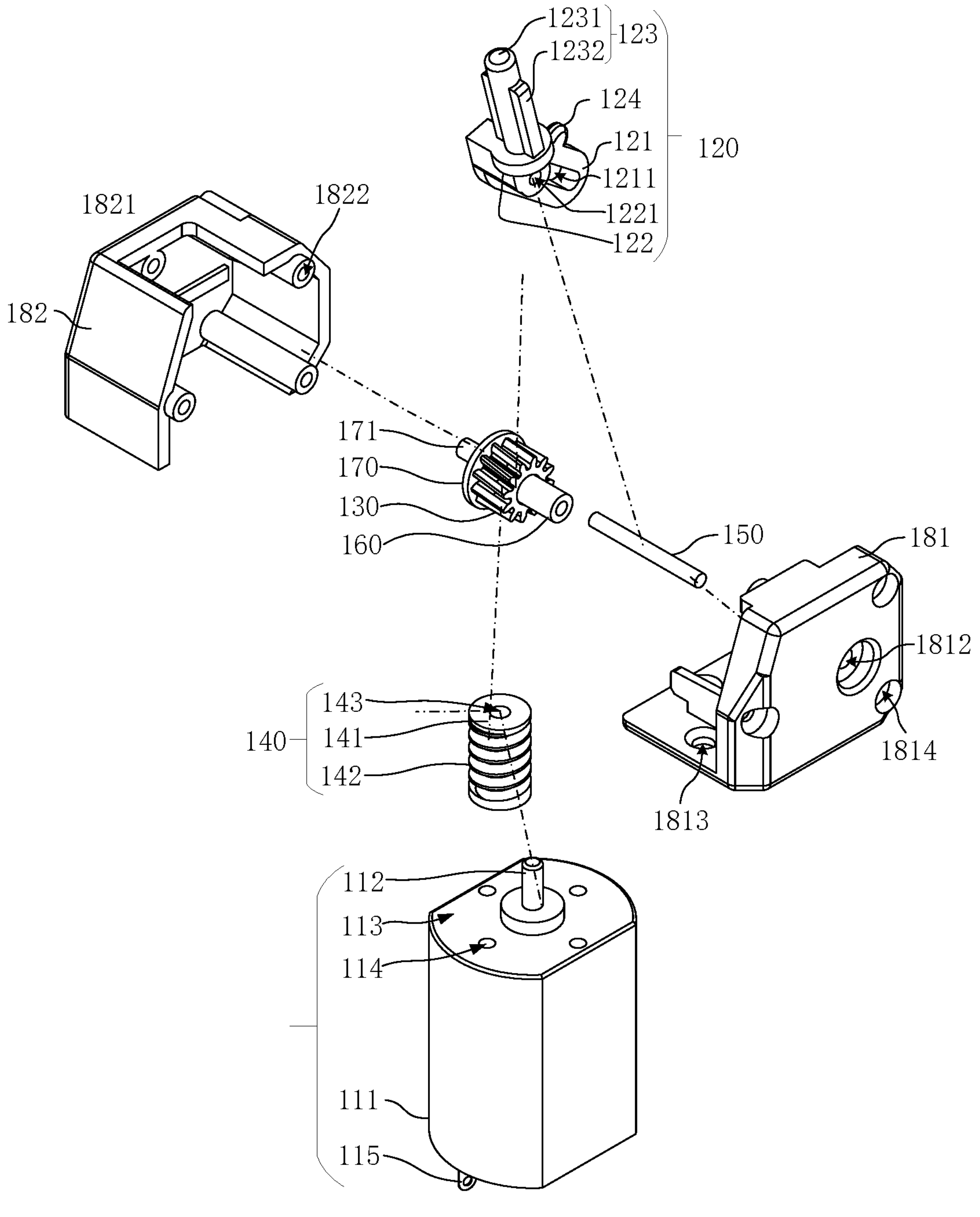
FIG. 8 is an exploded schematic diagram of the massage driving device of the massager according to one embodiment of the present disclosure.
Figure 9:
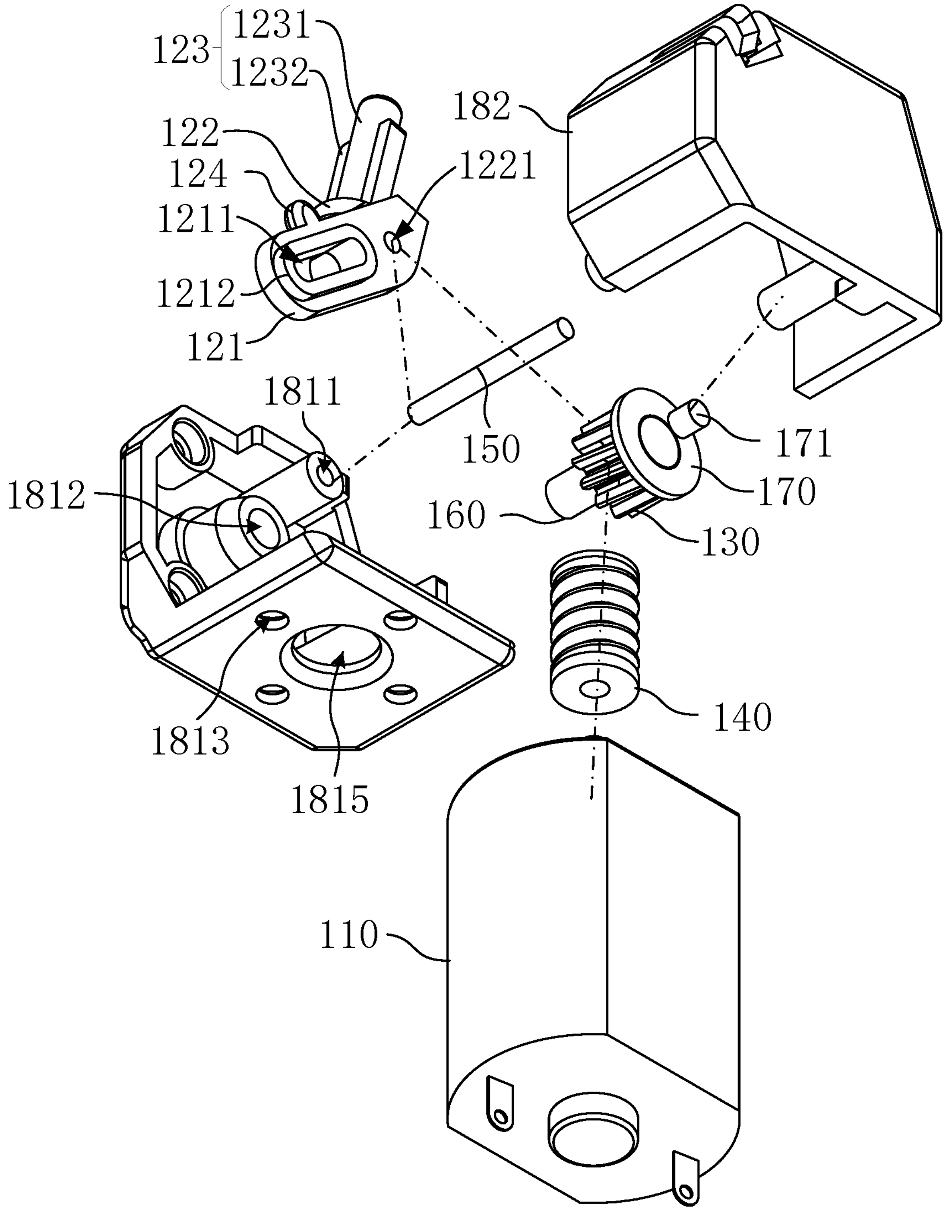
FIG. 9 is another exploded schematic diagram of the massage driving device of the massager according to one embodiment of the present disclosure.
Figure 10:
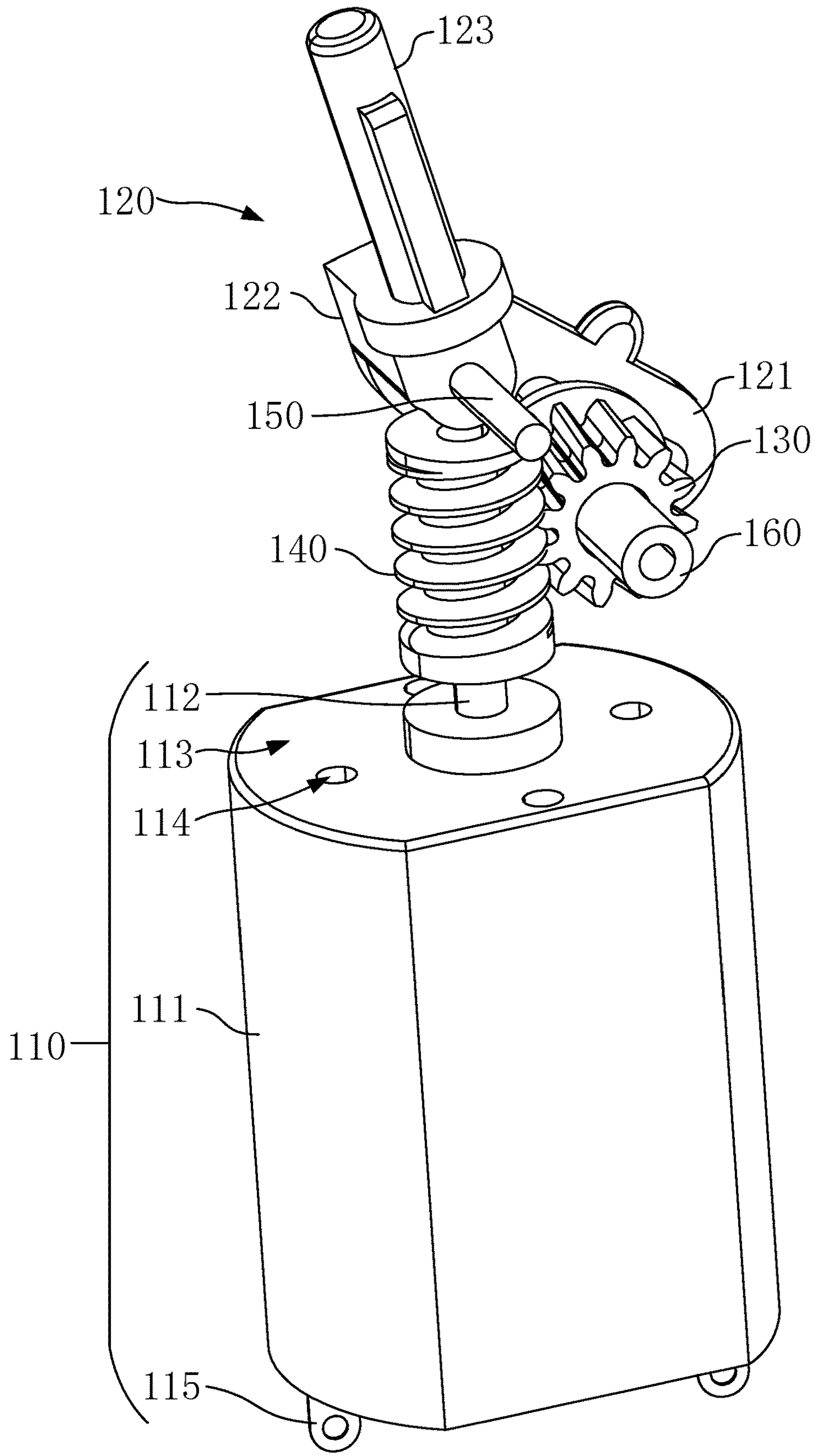
FIG. 10 is a schematic diagram of components of the massage driving device of the massager according to one embodiment of the present disclosure.

It is understood that the flexible massage component 320 in the massager main body 10 shown in FIG. 1 and the flexible massage component 320 in the massager main body 10 shown in FIG. 3 are shown in the first position X, and the flexible massage component 320 in the massager main body 10 shown in FIG. 2 is in a swinging process. It is understood that the flexible massage component 320 shown in FIG. 2 is in a position between the first position X and the second position Y. Therefore, the driving component 110 in the embodiment of the present disclosure is capable of driving the swinging component 120 and the flexible massage component 320 to swing in the swinging space 202, the swinging component 120 and the flexible massage component 320 are capable of swinging from the first position X to the second position Y during the swinging process, and the swinging component 120 and the flexible massage component 320 are capable of swinging from the second position Y to the first position X again. When the flexible massage component 320 swings to the first position X or the second position Y, at least part of the flexible massage component 320, such as the free end thereof, protrudes from the side walls of the housing 200 and is exposed to the external environment, so as to realize a massage mode of swinging flapping effect and to improve the user experience.

The massager main body 10 further comprises a flexible outer cover 310. The flexible outer cover 310 is sleeved on the housing 200. For instance, the flexible outer cover 310 and the flexible massage component 320 are integrally disposed. Thus, the flexible outer cover 310 in the embodiment of the present disclosure is sleeved on the housing 200, and the flexible massage component 320 is sleeved on the third swinging portion 123, so that there is no gap between the flexible massage component 320 and the flexible outer cover 310, and waterproof performance of the massager main body 10 in the embodiment of the present disclosure is greatly increased. Since the flexible outer cover 310 and the flexible massage component 320 are integrally disposed, the flexible massage component 320 and the flexible outer cover 310 are defined as a flexible massage sleeve 300. It is understood that the flexible massage component 320 and the flexible outer cover 310 are both made of flexible material.

The flexible outer cover 310 defines a swing space 312 at a position of the swinging space 202. The flexible massage component 320 is disposed within the swing space 312 and is capable of swinging within the swinging space 202 as well as the swing space 312.

An opening 311 is defined on one end of the flexible outer cover 310, and the flexible outer cover 310 is sleeved on the housing 200 through the opening 311 thereof. The flexible outer cover 310 is deformable, and the flexible outer over 310 is sleeved on the housing 200 by deforming at a position of the opening 311 thereof.

Figure 11:
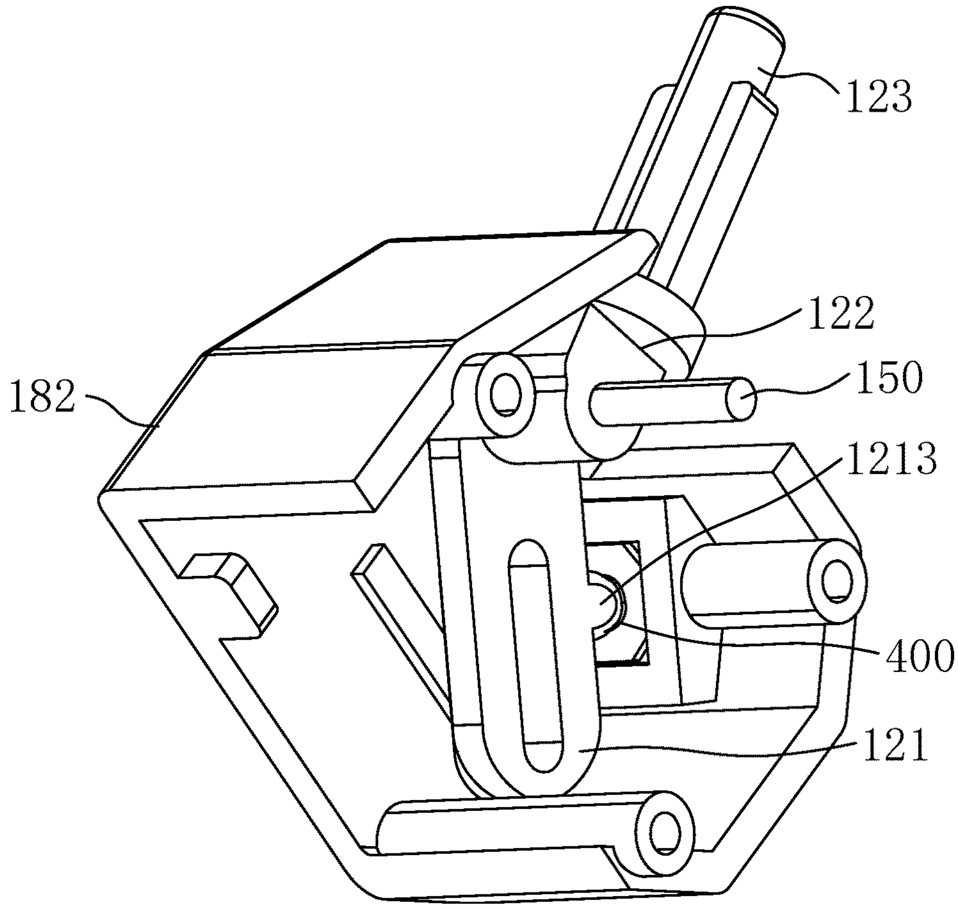
FIG. 11 is a schematic diagram of other components of the massage driving device of the massager according to one embodiment of the present disclosure.
Figure 12:
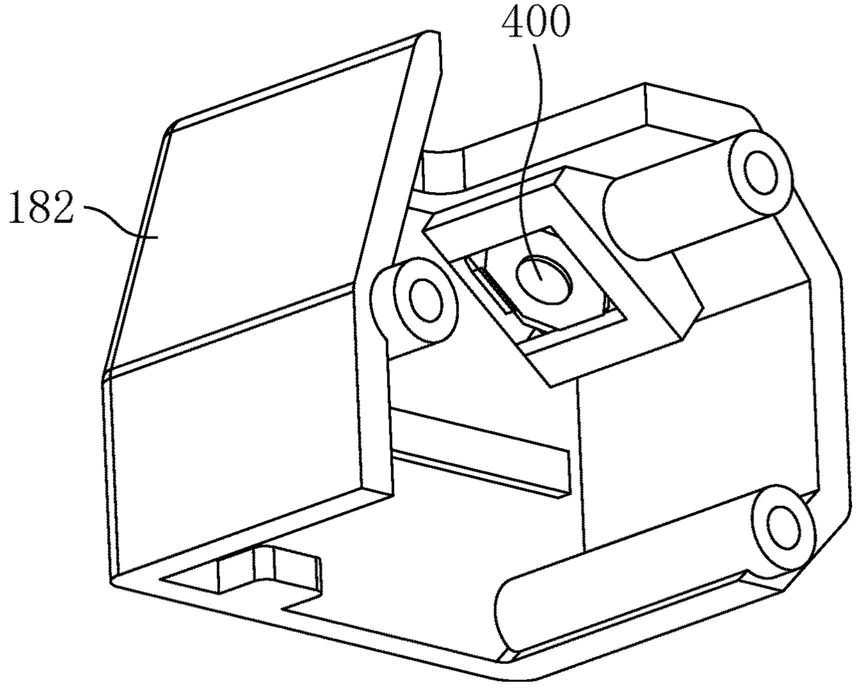
FIG. 12 is a schematic diagram of a sub-shell of the massage driving device of the massager according to one embodiment of the present disclosure.

As shown in FIGS. 11 and 12, the massager main body 10 further comprises a sensor 400 disposed in the chamber 201. For instance, the sensor 400 is mounted on the second driving sub-shell 182 of the drive housing 180. The swinging component 120 triggers the sensor 400 during the swinging process thereof, so that the sensor 400 detects a position signal of the flexible massage component 320 when the flexible massage component 320 abuts against a human body. For instance, the swinging component 120 further comprises a touching portion 124. The touching portion 124 is disposed on one side of the first swinging portion 121. When the shaft 171 of the eccentric wheel 170 drives the first swinging portion 121 to swing, the first swinging portion 121 swings along with the touching portion 124. During the swinging process, the touching portion 124 is capable of swinging to a position facing the sensor 400, and is capable of moving away from the position facing the sensor 400, thereby triggering the sensor. In other embodiments, the touching portion 124 is capable of triggering the sensor 400 by touching the sensor 400. When in actual use of the sensor 400, a circuit of the massager is powered when the sensor 400 is triggered, and the circuit is not powered when the sensor 400 is not triggered.

Figure 13:
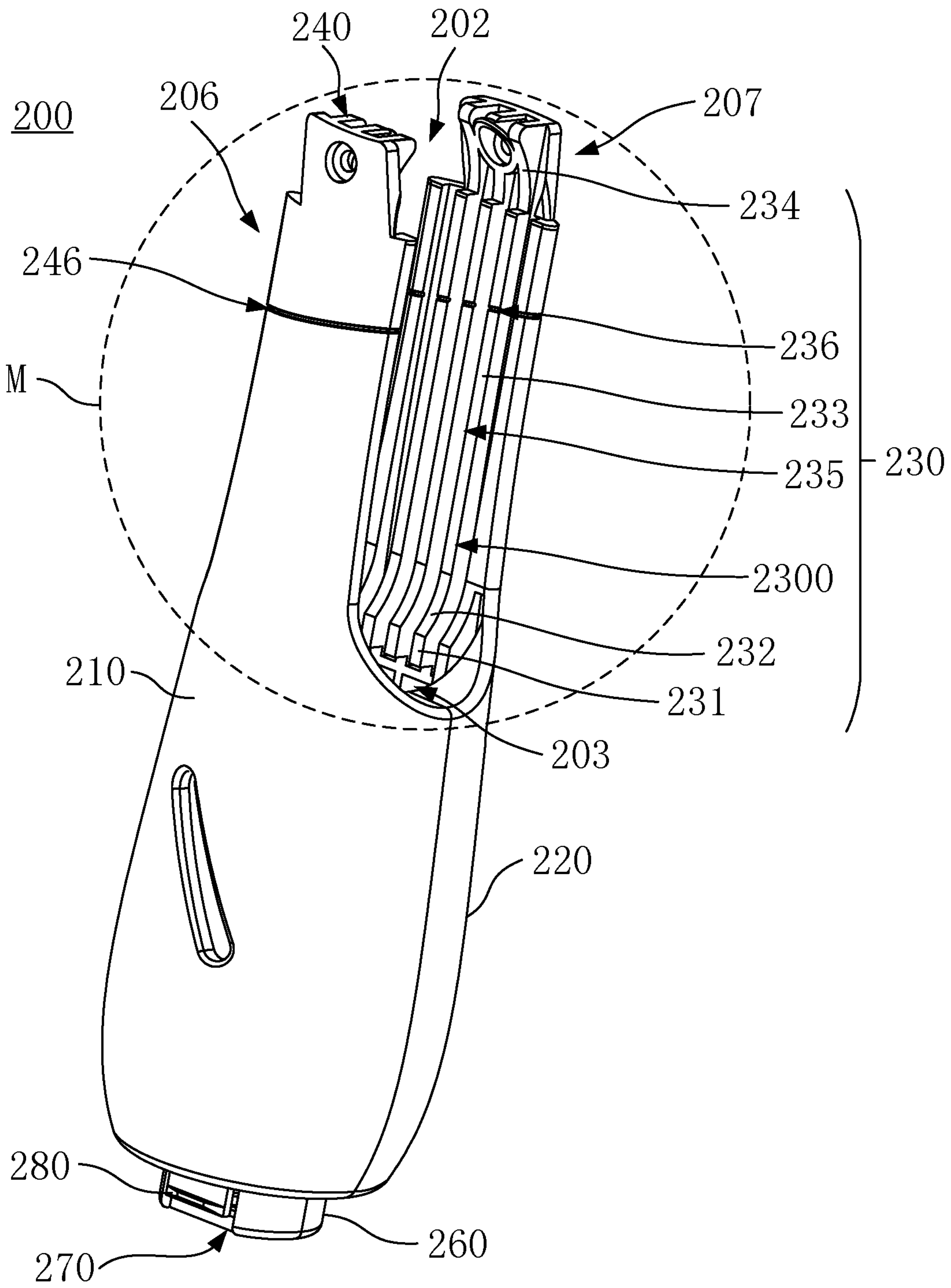
FIG. 13 is a schematic diagram of a housing of the massage driving device of the massager according to one embodiment of the present disclosure.
Figure 14:
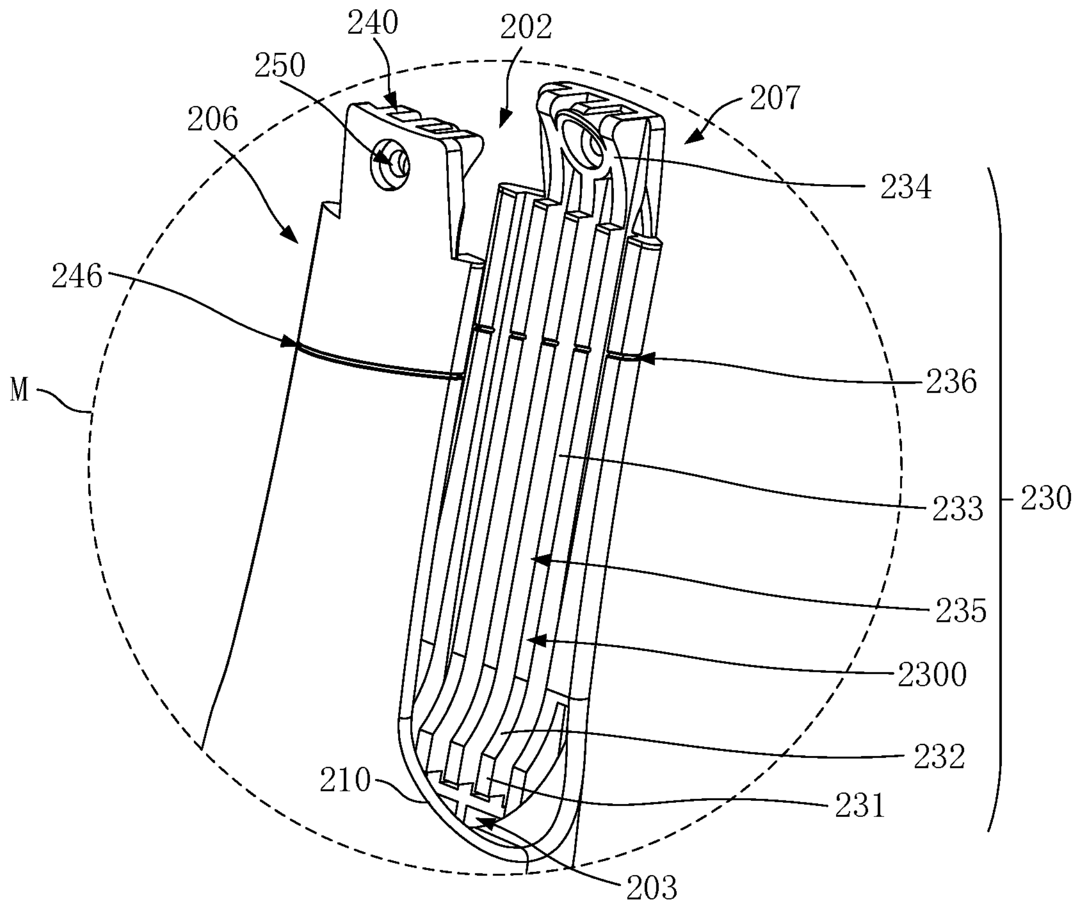
FIG. 14 is an enlarged schematic diagram of the portion M shown in FIG. 13.

As shown in FIGS. 13 and 14, the housing 200 comprises a first side wall 206 and a second side wall 207. The first side wall 206 and the second side wall 207 of the housing 200 are disposed opposite to each other. The outer surface 205 of the housing 200 is formed on the first side wall 206 and the second side wall 207. The first side wall 206 and the second side wall 207 are spaced apart from each other by the swinging space 202. For instance, the first side wall 206 and the second side wall 207 of the housing 200 are disposed symmetrically with respect to the swinging space 202.

For instance, the housing 200 further comprises a reinforcing structure 240 disposed on the first side wall and a reinforcing structures 230 disposed on the second side wall 207 of the housing 200. The reinforcing structure 240 on the first side wall 206 and the reinforcing structure 230 on the second side wall 207 are disposed opposite to each other.

For instance, the reinforcing structure 240 on the first side wall 206 and the reinforcing structure 230 on the second side wall 207 are symmetrically disposed with respect to the swinging space 202. The reinforcing structure 240 on the first side wall 206 is same as the reinforcing structure 230 on the second side wall 207, and the embodiment of the present disclosed takes the reinforcing structure 230 on the second side wall as an example for illustration.

The reinforcing structure 230 comprises reinforcing ribs 2300 extending along the length direction L1 of the housing 200. The reinforcing ribs 2300 are spaced apart from each other, e.g., the reinforcing ribs 2300 are equally spaced apart from each other. Each two adjacent reinforcing ribs 2300 define a first recess 235. It is noted that two of the reinforcing ribs form two first recesses 235 with edges of the second side wall 207.

Each of the reinforcing ribs 2300 comprises at least three sections, and the embodiment of the present disclosure takes an example that each of the reinforcing ribs 2300 comprises four sections for illustration. Specifically, the reinforcing ribs 2300 comprise a first reinforcing section 231, a second reinforcing section 232, a third reinforcing section 233, and a fourth reinforcing section 234. Each first reinforcing section 231, a corresponding second reinforcing section 232, a corresponding third reinforcing section 233, and a corresponding fourth reinforcing section 234 are sequentially connected in a direction from a position of the first through hole 203 to a top end of the housing 200. In other words, each first reinforcing section 231, the corresponding second reinforcing section 232, the corresponding third reinforcing section 233, and the corresponding fourth reinforcing section 234 are sequentially connected in a direction from a position close to the chamber 201 to the top end of the housing 200.

For instance, a height of each first reinforcing section 231 on the second side wall is greater than a height of each second reinforcing section 232 on the second side wall 207 and a height of each third reinforcing section 233 on the second side wall 207. A height of a lowest point of each second reinforcing section 232 on the second side wall 207 is not less than a height of a topmost point of each third reinforcing section 203 on the second side wall. A height of a topmost point of each fourth reinforcing section 234 on the second side wall 207 is greater than a height of the topmost point of each third reinforcing section 233 on the second side wall 207, and a height of a lowest point of each fourth reinforcing section 234 on the second side wall 207 is less than a height of a lowest point of each third reinforcing section 233 on the second side wall 207.

For instance, each first reinforcing section 231 is continuous and is of a rectangular structure.

For instance, the height of each second reinforcing section 232 on the second side wall gradually decreases along the direction from the position of the first through hole 203 to the top end of the housing 200. Specifically, a surface of each second reinforcing section 232 is an arc surface.

For instance, each third reinforcing section 233 is continuous, and each third reinforcing section 233 is of a rectangular structure.

The height of each fourth reinforcing section 234 on the second side wall gradually increases along the direction from the position of the first through hole 203 to the top end of the housing 200. Specifically, a surface of each fourth reinforcing section 234 is an arc surface.

In practice, the first side wall 206 and the second side wall 207 of the housing 200 are connected to a portion of the housing 200 defining the chamber 201. Each first reinforcing section 231 and each second reinforcing section 232 are disposed on portions of the first side wall 206 and the second side wall 207 close to the chamber 201, so as to enhance strengths of roots of the first side wall 206 and the second side wall 207. Each fourth reinforcing section 234 is disposed on a top portion of the first side wall 206 or a top portion of the second side wall 207, so as to enhance strengths of the top portion of the first side wall 206 and the top portion of the second side wall 207. The reinforcing ribs effectively save material while maintaining the strength of the housing 200.

It is understood that the first side wall 206 and the second side wall 207 are spaced apart from each other, and in a case that the first side wall 206 and the second side wall 207 are subjected to the external force, the first side wall 206 and the second side wall 207 deform slightly, so as to bring effective massage experience to the user.

The first side wall 206 defines a second recess 246, the second side wall 207 defines a third recess 236, and the second recess 236 and the third recess 246 have the same shape and are opposite to each other.

Figure 15:
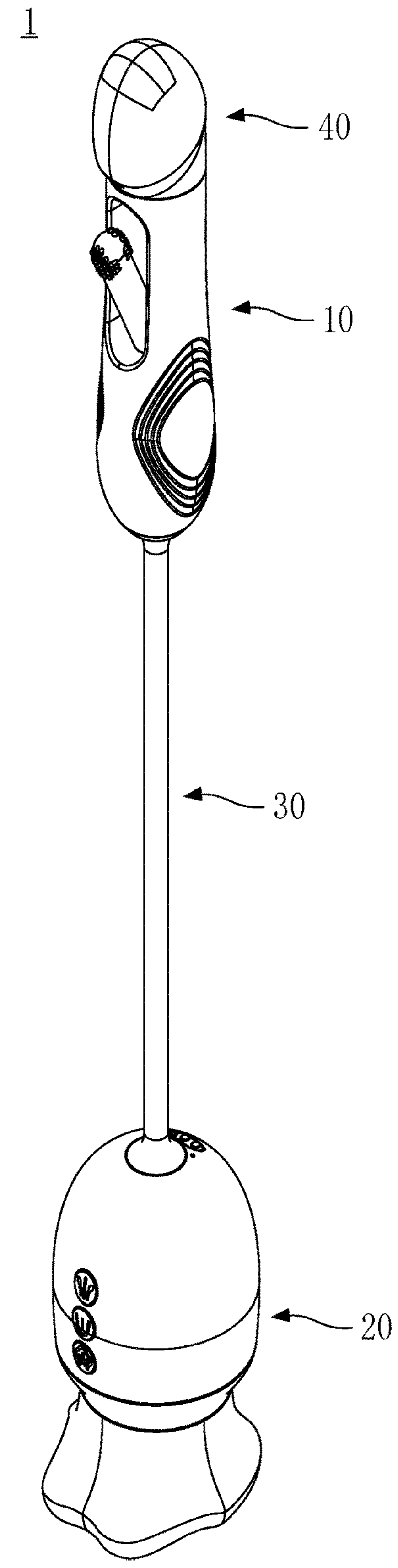
FIG. 15 is a perspective schematic diagram of the massager according to one embodiment of the present disclosure.
Figure 16:
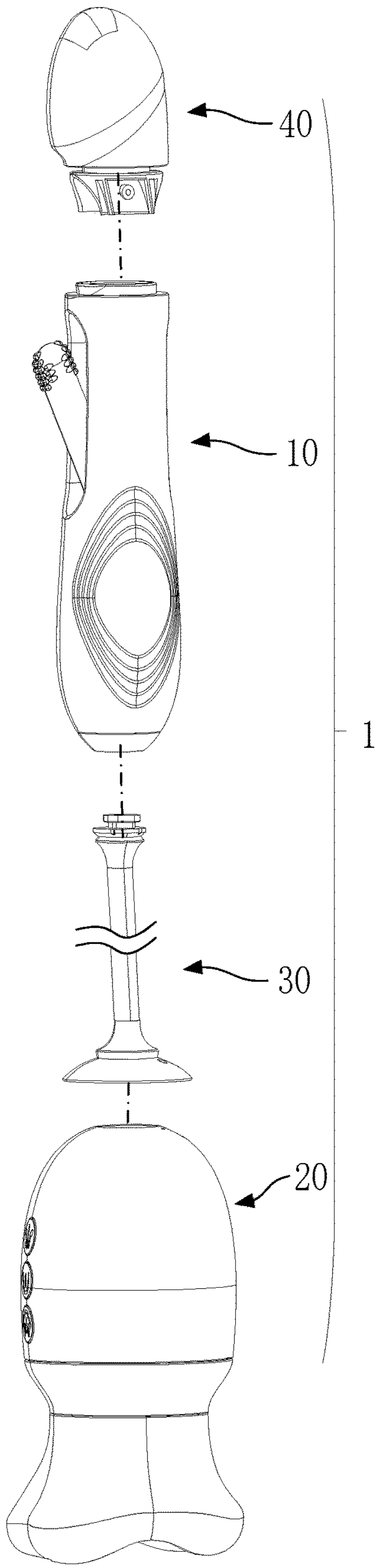
FIG. 16 is an exploded perspective schematic diagram of the massager according to one embodiment of the present disclosure.
Figure 17:
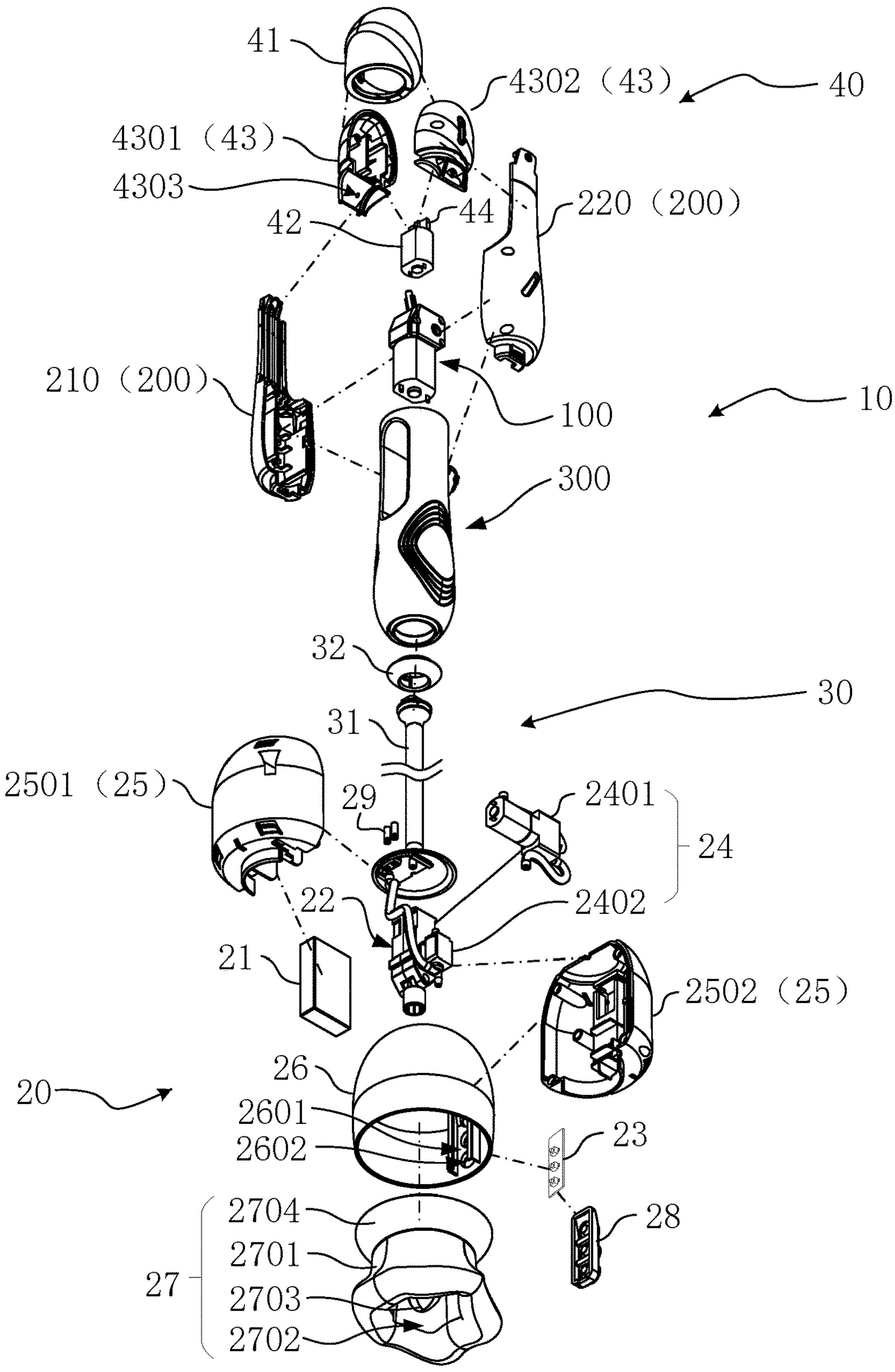
FIG. 17 is another exploded perspective schematic diagram of the massager according to one embodiment of the present disclosure.

As shown in FIGS. 15-17, the massager 1 comprises a massage head 40, a massager main body 10, a connecting assembly 30, and a second massage device 20. The massager main body 10 comprises the massage driving device 100, the housing 200, and the flexible massage sleeve 300. The massage driving device 100, the housing 200, and the flexible massage sleeve 300 of the massager main body 10 may be referred to FIGS. 1-12, and are not repeatedly described herein. It should be noted that the massager main body 10 of the massager 1 shown in FIGS. 15-17 also comprises the sensor 400, which is described above and not repeatedly described herein.

The massage head 40 and the massager main body 10 are connected to each other. Specifically, the massage head 40 and a top portion of the massager main body 10 are connected to form a first massage device. For instance, the massage head 40 comprises a massage head cover 41, a top motor 42, a top housing 43, and a top eccentric wheel 44. The top motor 42 and the top eccentric wheel 44 are disposed in the top housing 43. The massage head cover 41 is sleeved on an outer surface of the top housing 43. The top motor 42 is connected to the top eccentric wheel 44 and drives the top eccentric wheel 44 to rotate. It is understood that the top eccentric wheel 44 vibrates during rotation, enabling the top housing 43 and the massage head cover 41 to vibrate, so as to realize a purpose of massage. At the same time, the massage driving device 100 is capable of driving the flexible massage component 320 to swing to realize the purpose of massage. Therefore, in the embodiment of the present disclosure, after the massage head 40 is connected to the massager main body 10, massage of different positions of the human body is realized, which enhances the user experience.

The top housing 43 may be a single shell structure or shell structures connected together. In the embodiment of the present disclosure, the top housing 43 comprises two shell structures. For instance, the top housing 43 comprises a first top shell 4301 and a second top shell 4302. The first top shell 4301 is connected to the second top shell 4302, and both of the first top shell 4301 and the second top shell 4302 are connected to the housing 200. Optionally, the first top shell 4301, the second top shell 4302, and the housing 200 are connected by screws.

For instance, the first top shell 4301 and the second top shell 4302 define third screw holes 4303, and the housing 200 defines fourth screw holes 250. That is, the first sub-shell 210 and the second sub-shell 220 defines the fourth screw holes 250. During actual mounting of the top housing 43 and the housing 200, a portion of the top housing 43 is sleeved on the top portion of the top housing 43, so as to align the fourth screw holes 250 with the third screw holes 4303. Then the top housing 43 is connected to the housing 200 through fixing one or two screws in the fourth screw holes 250 and the third screw holes 4303. It is noted that the first top shell 4301 and the second top shell 4302 may be connected by other screws to increase stability of the connection between the first top shell 4301 and the second top shell 4302.

It is understood that the flexible outer cover 310 in the embodiment of the present disclosure is deformable. During the process of mounting the top housing and the housing 200, the flexible outer cover 310 is pushed to expose the top portion of the housing 200. After the top housing 43 is connected to the housing 200, a portion of the flexible outer cover 310 covers the top portion of the housing 200 as well as a portion of the top housing 43. Then the massage head cover 41 is sleeved on the top housing 43 as well as a portion of the flexible outer cover 310. Therefore the massage head 40 and the massager main body 10 are connected. It should be noted that the massage head cover 41 is sleeved on the flexible outer cover 310, and the massage head cover 41 and the flexible outer cover 410 are sealed to enhance the waterproof performance of the massager.

The second massage device 20 and the housing 200 are connected by the connecting assembly 30. The connecting assembly 30 comprises a connecting rod 31 and a connecting piece 32. The connecting rod 31 is made of a flexible material that is deformable, such as a flexible material that allows the connecting rod to bend. A first end of the connecting rod 31 is connected to the second massage device 20, and a second end of the connecting rod 31 is connected to the connecting piece 32. The connecting piece 32 is connected to the housing 200. Furthermore, after the connecting piece 32 is connected to the housing 200, a bottom portion of the flexible outer cover 310 is sleeved on the connecting piece 32.

For instance, the housing 200 comprises a sleeving portion 260 at the bottom portion of the housing 200 and a clamping structure 280 defined on the sleeving portion 260. The connecting piece 32 is sleeved to the sleeving portion 260, and the connecting piece 32 is engaged with the clamping structure 280 after being sleeved on the sleeving portion 260. It is understood that the connecting piece 32 and the housing 200 may be connected in other ways, such as by disposing threads thereon or by using other connecting structural pieces such as the screws.

The second massage device 20 comprises a battery 21, a bottom massage driving device 22, a circuit board 23, an air control device 24, a bottom housing 25, a bottom outer cover 26, a bottom massage component 27, and operation buttons 28. The battery 21, the bottom massage driving device 22, the circuit board 23, and the air control device 24 are mounted in the bottom housing 25.

Figure 18:
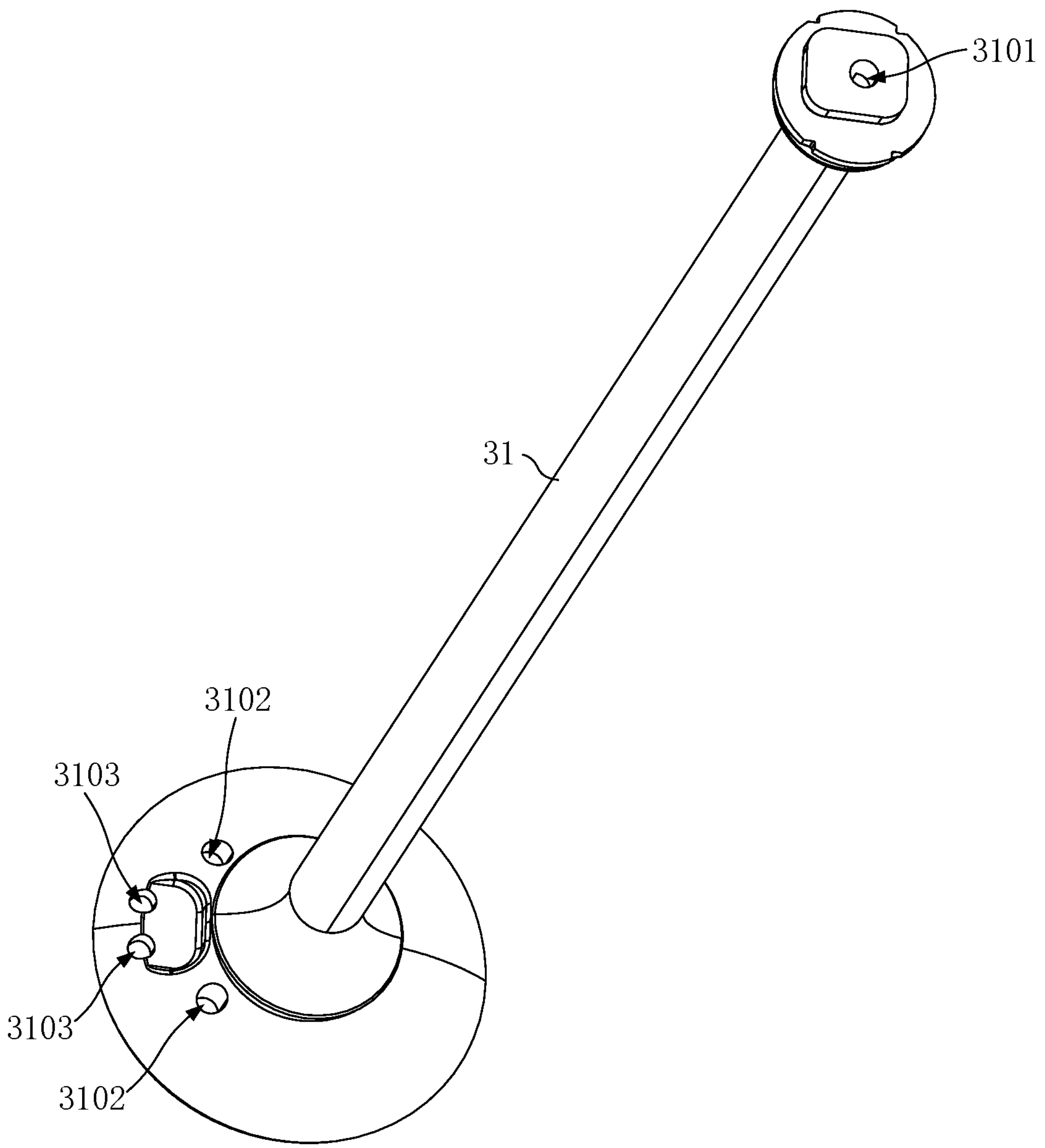
FIG. 18 is a schematic diagram of a connecting rod of the massager according to one embodiment of the present disclosure.
Figure 19:
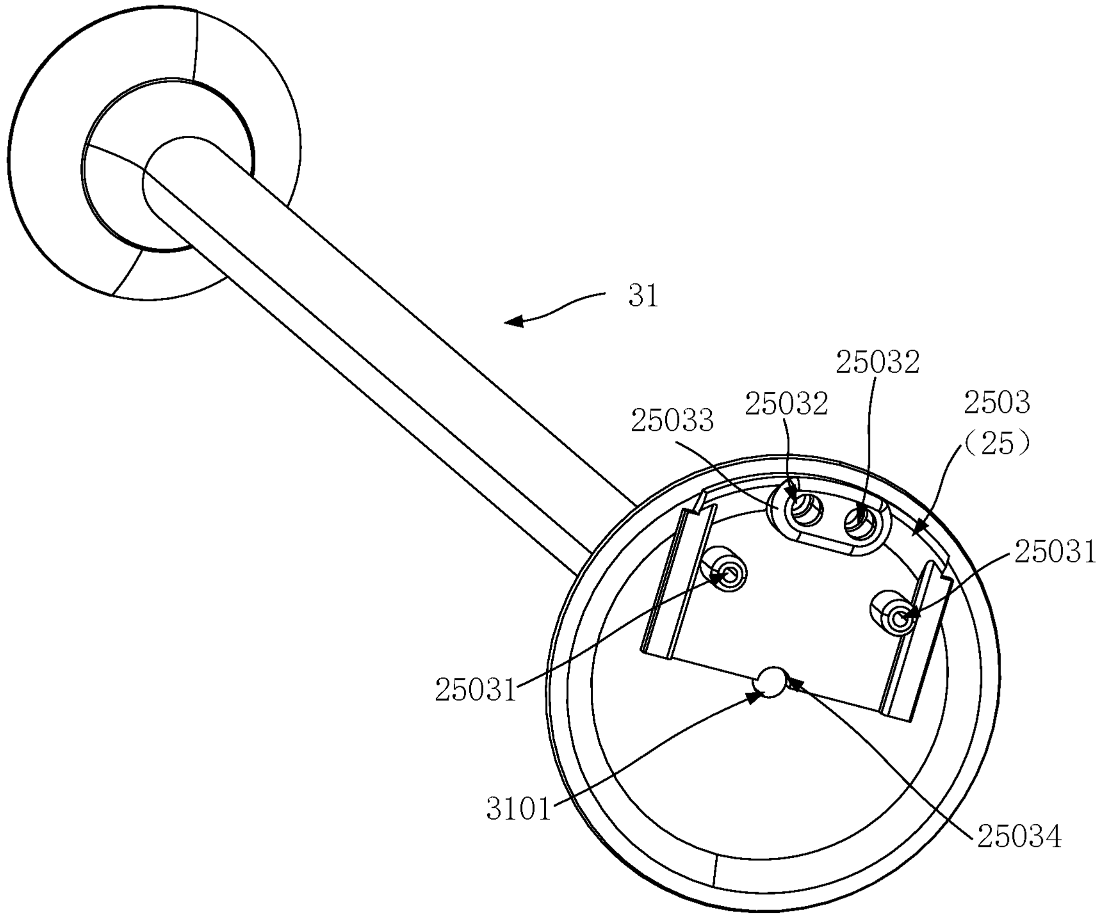
FIG. 19 is a schematic diagram of the connecting rod assembled with a connecting shell of the massager according to one embodiment of the present disclosure.

As shown in FIGS. 17-19, the circuit board 23 is electrically connected to the battery 21, the bottom massage driver 22, the air control device 24, the massage driving device 100, and the top motor 42 by wires. It is noted that the wires connecting the circuit board 23 and the massage driving device 100 pass through a second through hole 270 of the housing 200, a third through hole 25034 of the bottom housing 25, and a passage 3101 of the connecting assembly 30. It is understood that the second through hole 270 of the housing 200, the passage 3101 of the connecting assembly 30, and the third through hole 25034 of the bottom housing 25 are communicated.

The bottom housing 25 may be a single shell structure or shell structures connected together. The embodiment of the present disclosure takes an example that the bottom housing 25 comprises three shell structures for illustration. For instance, the bottom housing 25 comprises a first bottom shell 2501, a second bottom shell 2502, and a connecting shell 2503.

The first bottom shell 2501 and the second bottom shell 2502 are connected to form a cavity of the bottom housing 25. It is understood that after the first bottom shell 2501 and the second bottom shell 2502 are connected to define a through hole on top portions thereof. The through hole defined on the top portion of the first bottom shell 2501 and the top portion second bottom shell 2502 is communicated with the third through hole 25034. The connecting shell 2503 is mounted on the top portion of the first bottom shell 2501 and the top portion of the second bottom shell 2502. For instance, the connecting shell 2503 is confined by a snapping groove defined on the first bottom shell 2501 and/or a snapping groove defined on the second bottom shell 2502. The connecting shell 2503 defines the third through hole 25034, and the through hole defined on the top portion of the first bottom shell 2501 and the top portion of the second bottom shell 2502 is matched with and communicated with the third through hole 25034 to allow the wires to pass through.

The connecting shell 2503 is mounted on the first bottom shell 2501 and the second bottom shell 2502, and the connecting shell 2503 is disposed below a bottom portion of the connecting rod 31. The connecting shell 2503 defines two vent holes 25031, and the two vent holes 25031 are spaced apart from each other. Two dissipating holes 3102 are defined on the bottom portion of the connecting shell 2503 the two dissipating holes 3102 are communicated with the two vent holes 25031, and each of the vent holes 25031 is communicated with a corresponding dissipating hole 3102.

The second massage device 20 further comprises two charging terminals 29, and the two charging terminals 29 are electrically connected to the circuit board 2 by the wires. The connecting shell 2503 defines two fourth through holes 25032 for mounting the two charging terminals 29, and a bottom portion of the connecting rod 31 defines two fifth through holes 3103 for mounting the two charging terminals 29. Each of the charging terminals 29 is mounted in a corresponding fourth through hole 25032 and a corresponding fifth through hole 3103. In order to increase stability of the connecting shell 2503 for mounting the charging terminals 29, in the embodiment of the present disclosure, reinforcing rings 25033 are respectively disposed around the two fourth through holes 25032.

The bottom outer cover 26 is capable of being sleeved on the first bottom shell 2501 and the second bottom shell 2502, and the bottom outer cover 26 is also capable of being sleeved on the bottom portion of the connecting rod 31, so that the connecting assembly 30 is connected to the second massage device 20 through the bottom outer cover 26. It should be noted that the bottom outer cover 26 defines sixth through holes communicated with the fourth through holes 25032, and air holes communicated with the vent holes 25031. The air holes on the bottom outer cover 26 are configured to mount the charging terminals 29 to facilitate charging of the battery 21 by the charging terminals 29. The air holes of the bottom outer cover 26 are communicated with the external environment.

The battery 21, the bottom massage driving device 22, the circuit board 23, and the air control device 24 are disposed in the cavity defined by the first bottom shell 2501 and the second bottom shell 2502. For instance, the first bottom shell 2501 and the second bottom shell 2502 defines sub-cavities, and the battery 21, the bottom massage driving device 22, the circuit board 23, and the air control device 24 are one-to-one mounted in the sub-cavities defined by the first bottom shell 2501 and the second bottom shell 2502.

The operation buttons 28 are mounted in the bottom housing 26. For instance, the bottom housing 26 defines a clamping groove 2601 and button holes 2602. The operation buttons 28 are limited in the clamping groove 2601, and touch portions of the operation buttons 28 are respectively mounted in the button holes 2602. The circuit board 23 is disposed adjacent to and corresponding to the operation buttons 28, so as to facilitate the user to control a corresponding operation button to trigger a corresponding touch switch of the touch switches on the circuit board 23.

The bottom massage component 27 comprises a mouth-shaped massage component 2701, a massage cavity 2702, a massage tongue 2703, and a connecting portion 2704. One end of the mouth-shaped massage component 2701 is connected to the connecting portion 2704. The mouth-shaped massage component 2701 is adhered to a bottom portion of the bottom housing 25. The connecting portion 2704 is sleeved on a portion of the mouth-shaped massage component 2701 and a portion of the bottom housing 25, so that the mouth-shaped massage component 2701 is mounted on the bottom housing 25 through the connecting portion 2704. For instance, an edge of one end of the bottom housing 26 adjacent to the connecting portion 2704 abuts against the connecting portion 2704, and at this time, there is no gap between the bottom housing 26 and the connecting portion 2704.

The massage chamber 2702 is defined by the mouth-shaped massage component 2701, the massage tongue 2703 is disposed in the massage chamber 2702, and the massage tongue 2703 is enclosed by the mouth-shaped massage component 2701.

Figure 20:
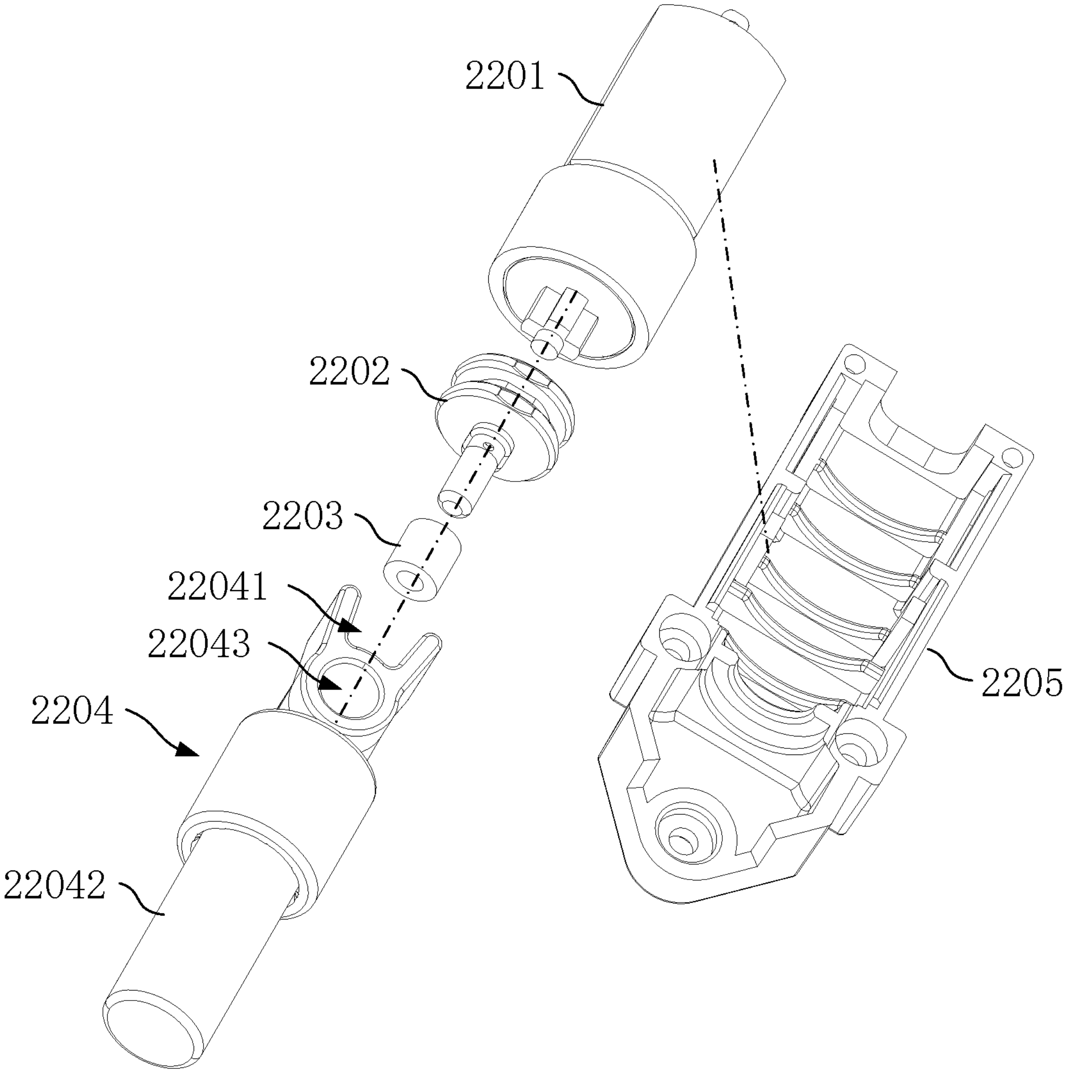
FIG. 20 is an exploded perspective schematic diagram of a bottom massage driving device of the massager according to one embodiment of the present disclosure.

As shown in FIG. 20, the bottom massage driving device 22 comprises a bottom massage motor 2201, a bottom eccentric wheel 2202, a shaft sleeve 2203, a bottom swinging component 2204, and a bottom massage driving housing 2205. The bottom massage motor 2201, the bottom eccentric wheel 2202, the shaft sleeve 2203, and the bottom swinging component 2204 are disposed in the bottom massage driving housing 2205, and the bottom massage driving housing 2205 is disposed in the bottom housing 25.

The bottom massage motor 2201 is connected to the bottom eccentric wheel 2202, and the bottom massage motor 2201 drives the bottom eccentric wheel 2202 to rotate. The bottom eccentric wheel 2202 is connected to the bottom swinging component 2204 and drives the bottom swinging component 2204 to swing.

The bottom swinging component 2204 comprises a swinging slot 2041, a sixth shaft hole 22043, and a swinging column 22042. The sixth shaft hole 22043 of the bottom swinging component 2204 is mounted on the bottom massage driving housing 2205 through a rotating shaft. The bottom swinging component 2204 is capable of swinging around the rotating shaft that passes through the sixth shaft hole 22043 thereof.

During a swinging process of the bottom eccentric wheel 2202, a shaft of the bottom eccentric wheel 2202 drives walls on two sides of the swinging slot 22041, so as to drive the bottom swinging component 2204 to swing around the rotating shaft passing through the sixth shaft hole 22043 thereof.

The swinging column 22042 is at least partially mounted on the massage tongue 2703, thereby driving the massage tongue 2703 to swing.

In the embodiment of the present disclosure, in order to prevent the shaft of the bottom eccentric wheel 2202 from being damaged due to collision with the walls on the two sides of the swinging slot 22041, the shaft sleeve 2203 is sleeved on the shaft of the bottom eccentric wheel 2202 to protect the shaft of the bottom eccentric wheel 2202.

The air control device 24 comprises an air pump 2401 and a solenoid valve 2402. Both of the air pump 2401 and the solenoid valve 2402 are electrically connected to the circuit board 23 by the wires. The air pump 2401 and the solenoid valve 2402 are communicated with each other by a first vent pipe. The air pump 2401 is communicated with a first one of the two vent holes 25031 through a second vent pipe, and the solenoid valve 2402 is communicated with a second one of the two vent holes 25031 through a third vent pipe. The air pump 2401 and the solenoid valve 2402 are communicated with the external environment through the two vent holes 25031, the two dissipating holes 3102, and the two air holes on the bottom outer cover 26.

When the mouth-shaped massage component 2701 is attached to a skin of the user, the air control device 24 is operated as follow.

The air pump 2401 is turned on and the solenoid valve 2402 is turned, creating a negative pressure in the massage chamber 2702. It is understood that the mouth-shaped massage component 2701 is tightly attached to the skin of the user, so that the massage chamber 2702 and the skin of the user together form the negative pressure when the air pump 2401 is in a working state.

The air pump 2401 is turned off and the solenoid valve 2402 is turned on, releasing the negative pressure formed in the massage chamber 2702.

The circuit board 23 is configured to turn on or turn off the air pump 2401 and turn on or turn off the solenoid valve 2402.

The massager provided by the embodiments of the present disclosure is described in detail above, specific examples are applied herein to illustrate principles and implementations of the present disclosure, and the above illustrations of the embodiments are only used to help understand methods and core ideas of the present disclosure. Meanwhile, for those skilled in the art, based on the ideas of the present disclosure, changes would be made in specific implementations and application scope. In summary, the contents of the specification should not be construed as a limitation of the present disclosure.

What is claimed is:

1. A massager, comprising:
- a housing,
- a swinging component,
- a driving component, and
- a flexible massage component;
- wherein the housing defines a chamber and a swinging space along a length direction thereof; the chamber is defined by an inner surface of the housing; the swinging space is defined by an outer surface of the housing;
- wherein a first portion of the swinging component is disposed in the chamber; a second portion of the swinging component is disposed in the swinging space; the driving component is disposed in the chamber; the driving component is connected to the swinging component and drives the swinging component to move;
- wherein the flexible massage component is sleeved on the first portion, disposed in the swinging space, of the swinging component; the swinging component and the flexible massage component are driven by the driving component to swing back and forth along a transverse direction of the housing, and the flexible massage component swings from a first position outside side walls of the housing to a second position outside the side walls of the housing; when the flexible massage component swings to the first position or the second position, a free end of the flexible massage component protrudes from the side walls of the housing and is exposed to an external environment;
- wherein the massager further comprises a turbine and a gear; the driving component is connected to the turbine and drives the turbine to rotate; the turbine is engaged with the gear; the gear is connected to the swinging component and drives the swinging component to swing;
- wherein the driving component drives the turbine to rotate, and the turbine rotates to drive the gear to rotate, so that the gear drives the swinging component to swing within a predetermined range;

wherein the driving component comprises a driving body and a driving shaft connected to the driving body; the turbine is fixedly connected to the driving shaft;

wherein the massager further comprises a first shaft and a second shaft; the swinging component is rotatably connected to the first shaft; the gear is rotatably connected to the second shaft;

wherein the swinging component comprises a first swinging portion, a second swinging portion, and a third swinging portion; the gear is connected to the first swinging portion and drives the first swinging portion to rotate; the second swinging portion is fixedly connected to the first swinging portion; the second swinging portion is rotatably connected to the first shaft; the third swinging portion is fixedly connected to the second swinging portion;

wherein the first swinging portion and the third swinging portion are bent with respect to the second swinging portion; the second swinging portion is located on one end of the turbine, the second swinging portion is spaced apart from the turbine; the first swinging portion and the gear are located on a peripheral side of the turbine.

2. The massager according to claim 1, wherein a distance between the free end of the flexible massage component protruding from the side walls of the housing and the side walls of the housing is 2 cm.

3. The massager according to claim 1, wherein the massager further comprises a flexible outer cover; the flexible outer cover is sleeved on the housing; the flexible outer cover and the flexible massage component are integrally disposed.

4. The massager according to claim 1, wherein the massager further comprises a sensor; the sensor is disposed in the chamber; the swinging component is configured to trigger the sensor in a swinging process of the swinging component, so that the sensor detects a position signal of the flexible massage component when the flexible massage component abuts against a human body.

5. The massager according to claim 1, wherein the third swinging portion comprises a swinging structure and at least one positioning structure; the at least one positioning structure is disposed on a peripheral side of the swinging structure; the flexible massage component is sleeved on the swinging structure and the at least one positioning structure.

6. The massager according to claim 1, wherein the first swinging portion, the second swinging portion, and the third swinging portion are integrally disposed.

7. The massager according to claim 1, wherein the first winging portion is disposed in the chamber; the third winging portion is disposed in the swinging space.

8. The massager according to claim 7, wherein the housing further comprises a through hole; the chamber is communicated with the swinging space through the through hole; the second swinging portion is at least partially disposed in the through hole.

9. The massager according to claim 1, wherein an end surface of the gear away from the turbine is connected to the first swinging portion through an eccentric wheel.

10. The massager according to claim 9, wherein the eccentric wheel and the gear are integrally disposed.

11. The massager according to claim 9, wherein the first swinging portion defines a swinging groove; a shaft of the eccentric wheel is movable in the swinging groove.

12. The massager according to claim 11, wherein the first swinging portion comprises a reinforcing piece; the reinforcing piece is disposed around the swinging groove.

13. The massager according to claim 11, wherein the massager further comprises a sensor; the sensor is disposed in the chamber; the swinging component is configured to trigger the sensor in a swinging process of the swinging component, so that the sensor detects a position signal of the flexible massage component when the flexible massage component abuts against a human body.

14. The massager according to claim 1, wherein the housing comprises a first side wall and a second side wall; the first side wall and the second side wall of the housing are spaced apart from each other and are disposed opposite to each other; the first side wall and the second side wall define the swinging space;

wherein the housing further comprises a reinforcing structure disposed on the first side wall and a reinforcing structure disposed on the second side wall; the reinforcing structure on the first side wall and the reinforcing structure on the second side wall are spaced apart from each other and are disposed opposite to each other; at least one of the reinforcing structure on the first side wall and the reinforcing structure on the second side wall comprises reinforcing ribs; the reinforcing ribs are spaced apart from each other; the reinforcing ribs extend along the length direction of the housing.

15. The massager according to claim 14, wherein each of the reinforcing ribs comprise a first reinforcing section, a second reinforcing section, a third reinforcing section, and a fourth reinforcing section; each first reinforcing section, a corresponding second reinforcing section, a corresponding third reinforcing section, and a corresponding fourth reinforcing section are sequentially connected in a direction from a position close to the chamber to a top end of the housing;

a height of each first reinforcing section on the second side wall is greater than a height of each second reinforcing section on the second side wall and a height of each third reinforcing section on the second side wall; and/or a height of a lowest point of each second reinforcing section on the second side wall is not less than a height of a topmost point of each third reinforcing section on the second side wall; and/or a height of a topmost point of each fourth reinforcing section on the second side wall is greater than a height of the topmost point of each third reinforcing section on the second side wall, and a height of a lowest point of each fourth reinforcing section on the second side wall is less than a lowest point of each third reinforcing section on the second side wall.

16. The massager according to claim 15, wherein each first reinforcing section is of a rectangular structure; each third reinforcing section is of a rectangular structure; and/or the height of each second reinforcing section on the second side wall gradually decreases along the direction from the position close to the chamber to the top end of the housing; and/or the height of each fourth reinforcing section on the second side wall gradually increases along the direction from the position close to the chamber to the top end of the housing.

* * * * *